US012627951B2

(12) United States Patent
Surendran et al.

(10) Patent No.: US 12,627,951 B2
(45) Date of Patent: May 12, 2026

(54) FIFTH GENERATION CORE ENHANCEMENTS TO SUPPORT AD HOC AND DYNAMIC GROUP BASED SERVICES FOR EDGE DEPLOYMENTS

(71) Applicant: NOKIA TECHNOLOGIES OY, Espoo (FI)

(72) Inventors: Renil Surendran, Kerala-State (IN); Jisha George, Karnataka-State (IN); Malathi Ponniah, Bangalore (IN); Shubhranshu Singh, Seeheim-Jugenheim (DE); Bruno Landais, Pleumeur-Bodou (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 443 days.

(21) Appl. No.: 18/138,570

(22) Filed: Apr. 24, 2023

(65) Prior Publication Data

US 2024/0357323 A1 Oct. 24, 2024

(51) Int. Cl.
H04W 4/08 (2009.01)
H04W 84/18 (2009.01)

(52) U.S. Cl.
CPC ..................................... H04W 4/08 (2013.01)

(58) Field of Classification Search
CPC ....... H04W 4/08; H04W 24/10; H04W 76/11; H04W 88/14; H04W 76/12; H04W 12/009; H04W 84/18; H04W 80/10; H04W 36/0011; H04L 61/5069; H04B 3/544; H04M 3/2263
See application file for complete search history.

(56) References Cited

U.S. PATENT DOCUMENTS

| | | | | |
|---|---|---|---|---|
| 11,558,346 | B2 * | 1/2023 | Zong | .................... H04L 61/5014 |
| 12,022,545 | B2 * | 6/2024 | Afzal | .................. H04M 7/1235 |
| 2012/0117230 | A1 * | 5/2012 | McColGan | ............ G06Q 10/10 |
| | | | | 709/224 |
| 2019/0254118 | A1 * | 8/2019 | Dao | ....................... H04L 67/141 |
| 2021/0112478 | A1 * | 4/2021 | Dannebro | ............. H04W 40/24 |
| 2021/0368576 | A1 * | 11/2021 | Kim | ....................... H04W 76/25 |
| 2022/0103335 | A1 * | 3/2022 | Moon | ..................... H04L 7/005 |
| 2022/0150797 | A1 * | 5/2022 | Yin | .................. H04M 15/8228 |
| 2022/0311826 | A1 * | 9/2022 | Chauhan | ................ H04W 8/26 |
| 2023/0091077 | A1 * | 3/2023 | Yao | ....................... H04W 40/20 |
| | | | | 455/456.1 |

(Continued)

OTHER PUBLICATIONS

Nokia et al., "KI#2 conclusion proposal", 3GPP TSG-WG SA2 Meeting #152E, Aug. 17-26, 2022, S2-2207748, 2 pages.

(Continued)

*Primary Examiner* — Andrew Wendell
(74) *Attorney, Agent, or Firm* — SQUIRE PATTON BOGGS (US) LLP

(57) ABSTRACT

Systems, methods, apparatuses, and computer program products for creating implicit ad hoc groups of UE based upon specific criteria. One method may include forming, by a session management function, at least one ad-hoc group of user equipment based upon detecting user equipment matching at least one grouping criteria; and reporting, by the session management function, the forming of the at least one ad-hoc group to a network exposure function or an application function based upon at least one notification condition.

19 Claims, 12 Drawing Sheets

(56) References Cited

U.S. PATENT DOCUMENTS

| | | | | |
|---|---|---|---|---|
| 2023/0103760 | A1* | 4/2023 | Ramamoorthy | H04W 4/10 455/411 |
| 2023/0422142 | A1* | 12/2023 | Vakeesar | H04W 40/20 |
| 2024/0007880 | A1* | 1/2024 | Cakulev | H04L 43/0829 |
| 2024/0171647 | A1* | 5/2024 | Zhao | H04L 67/51 |
| 2024/0334232 | A1* | 10/2024 | Talebi Fard | H04W 24/10 |
| 2024/0373401 | A1* | 11/2024 | Chun | H04W 68/02 |

OTHER PUBLICATIONS

3GPP TR 23.700-48 V18.0.0 (Dec. 2022), 3rd Generation Partnership Project; Technical Specification Group Services and System Aspects; 5G System Enhancements for Edge Computing; Phase 2 (Release 18), 196 pages.

3GPP TS 23.501 V18.1.0 (Mar. 2023), 3rd Generation Partnership Project; Technical Specification Group Services and System Aspects; System architecture for the 5G System (5GS); Stage 2 (Release 18), 667 pages.

3GPP TS 23.502 V18.1.1 (Apr. 2023), 3rd Generation Partnership Project; Technical Specification Group Services and System Aspects; Procedures for the 5G System (5GS); Stage 2 (Release 18), 829 pages.

3GPP TS 23.503 V18.1.0 (Mar. 2023), 3rd Generation Partnership Project; Technical Specification Group Services and System Aspects; Policy and charging control framework for the 5G System (5GS); Stage 2 (Release 18), 165 pages.

3GPP TS 23.548 V18.1.1 (Apr. 2023), 3rd Generation Partnership Project; Technical Specification Group Services and System Aspects; 5G System Enhancements for Edge Computing; Stage 2 (Release 18), 73 pages.

3GPP TS 29.551 V18.1.0 (Mar. 2023), 3rd Generation Partnership Project; Technical Specification Group Core Network and Terminals; 5G System; Packet Flow Description Management Service; Stage 3 (Release 18), 44 pages.

* cited by examiner

Figure 2A:
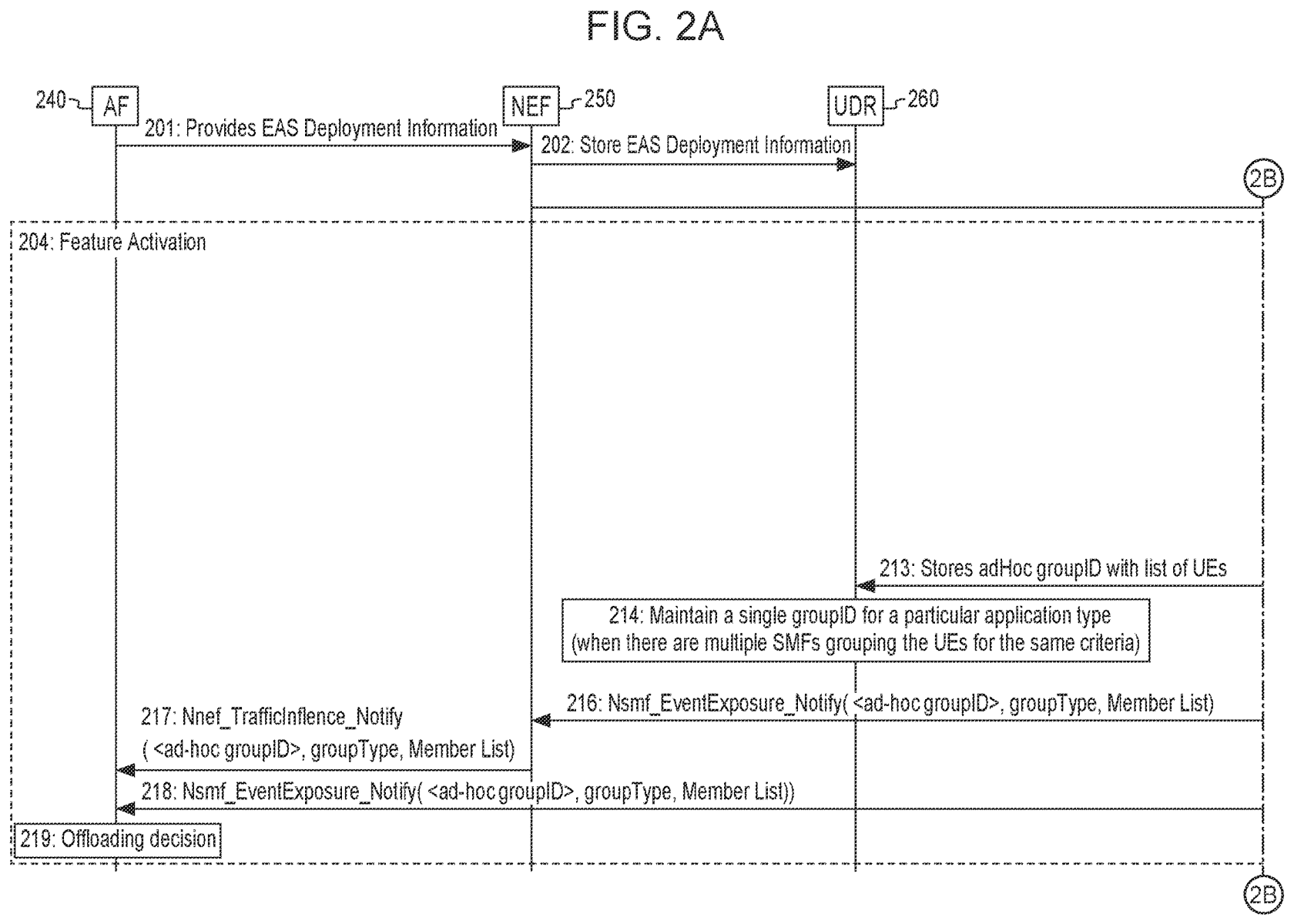

| NEF | ~ 250

| UDR | ~ 260

201: Provides EAS Deployment Information

202: Store EAS Deployment information

204: Feature Activation

213: Stores adHoc groupID with list of UEs

214: Maintain a single groupID for a particular application type
(when there are multiple SMFs grouping the UEs for the same criteria)

216: Nsmf_EventExposure_Notify( <ad-hoc groupID>, groupType, Member List)

217: Nnef_TrafficInflence_Notify
( <ad-hoc groupID>, groupType, Member List)

218: Nsmf_EventExposure_Notify( <ad-hoc groupID>, groupType, Member List))

219: Offloading decision

FIG. 2B

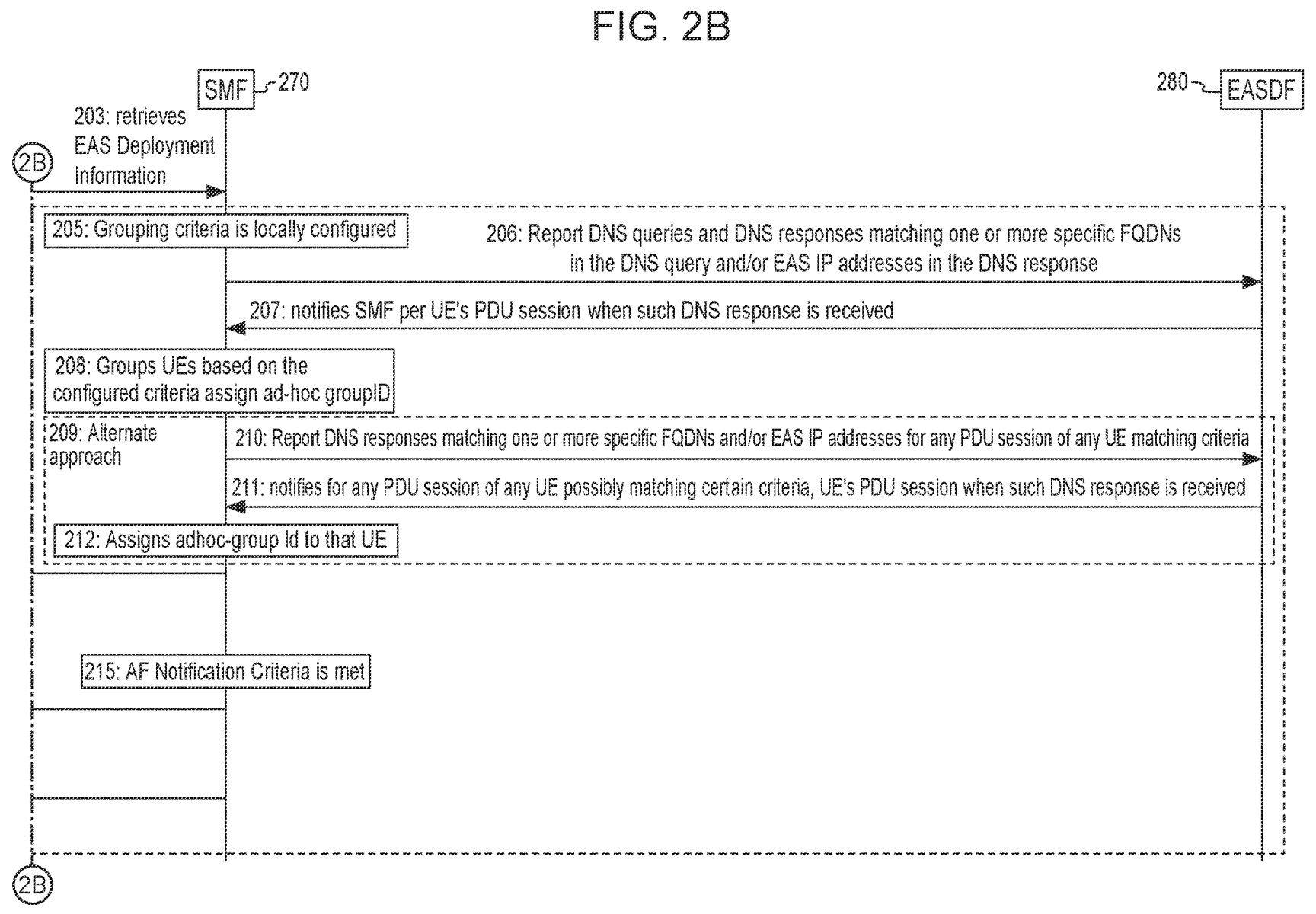

SMF 270

EASDF 280

203: retrieves
EAS Deployment
Information

205: Grouping criteria is locally configured

206. Report DNS queries and DNS responses matching one or more specific FQDNs in the DNS query and/or EAS IP addresses in the DNS response 207: notifies SMF per UE's PDU session when such DNS response is received 208: Groups UEs based on the configured criteria assign ad-hoc groupID 209: Alternate approach 210. Report DNS responses matching one or more specific FQDNs and/or EAS IP addresses for any PDU session of any UE matching criteria 211: notifies for any PDU session of any UE possibly matching certain criteria, UE's PDU session when such DNS response is received 212: Assigns adhoc-group Id to that UE 215: AF Notification Criteria is met

2B

2B

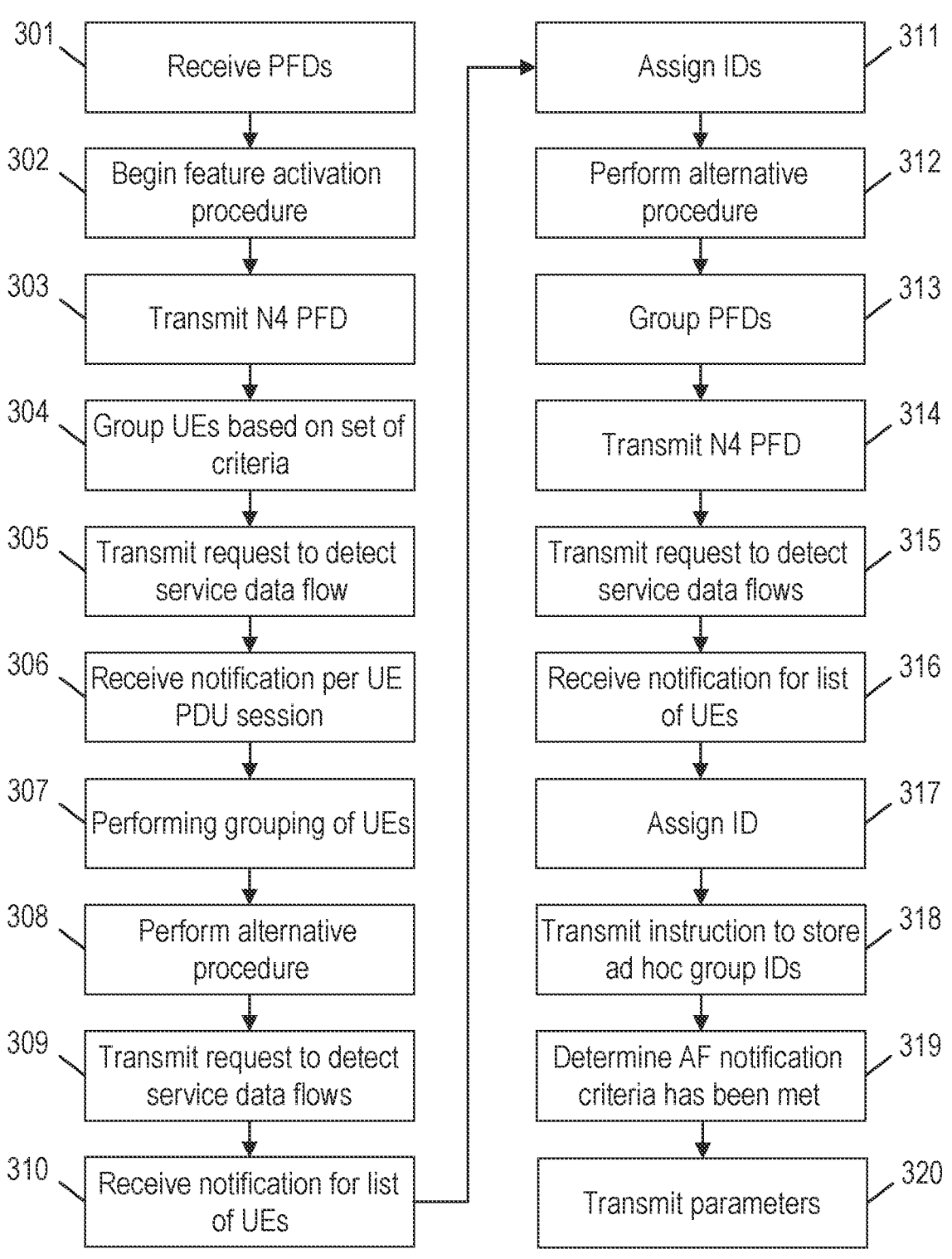

301 Receive PFDs

302 Begin feature activation procedure

303 Transmit N4 PFD

304 Group UEs based on set of criteria

305 Transmit request to detect service data flow

306 Receive notification per UE PDU session

307 Performing grouping of UEs

308 Perform alternative procedure

309 Transmit request to detect service data flows

310 Receive notification for list of UEs

311 Assign IDs

312 Perform alternative procedure

313 Group PFDs

314 Transmit N4 PFD

315 Transmit request to detect service data flows

316 Receive notification for list of UEs

317 Assign ID

318 Transmit instruction to store ad hoc group IDs

319 Determine AF notification criteria has been met

320 Transmit parameters

FIG. 3

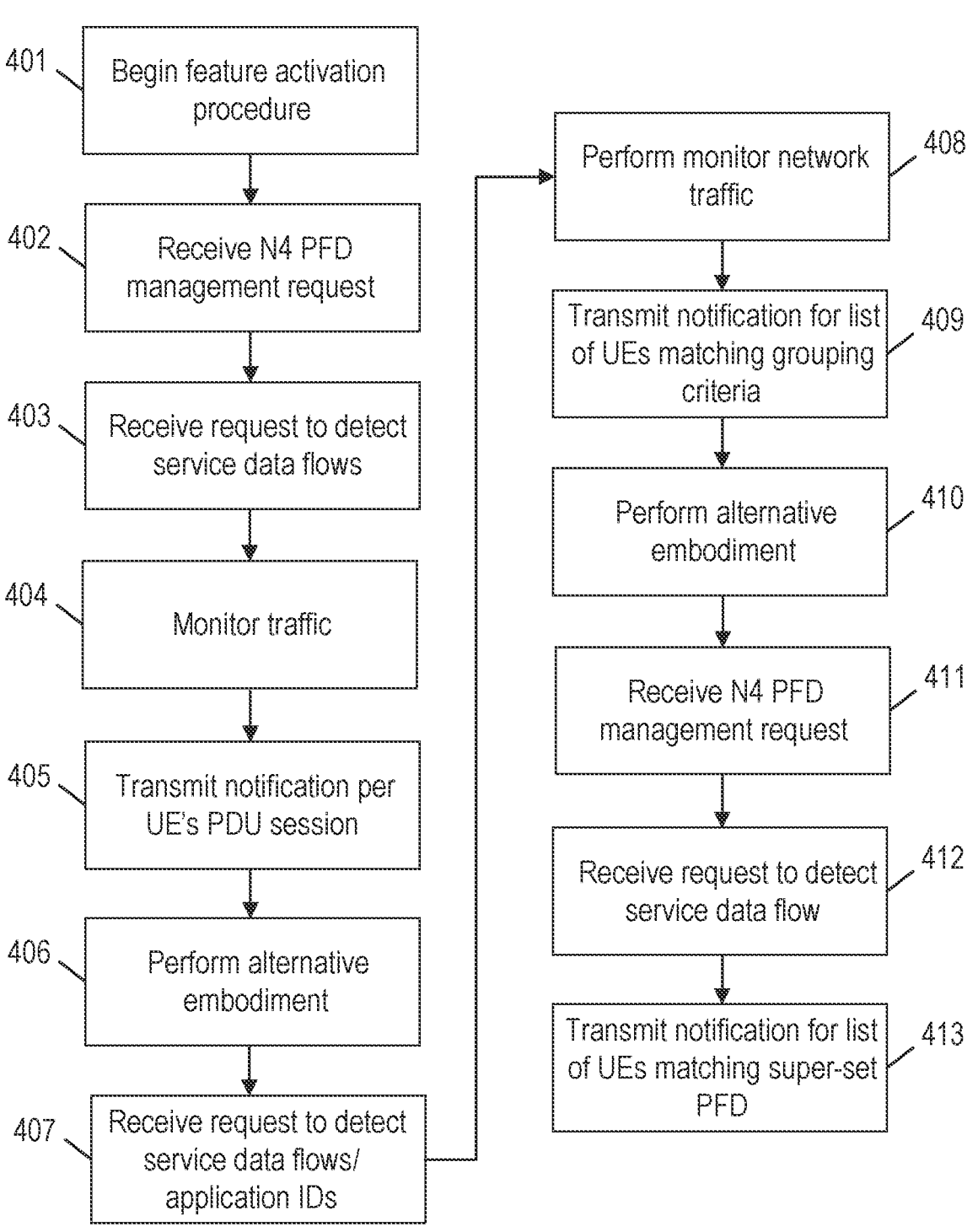

401 — Begin feature activation procedure

402 — Receive N4 PFD management request

403 — Receive request to detect service data flows

404 — Monitor traffic

405 — Transmit notification per UE's PDU session

406 — Perform alternative embodiment

407 — Receive request to detect service data flows/ application IDs

408 — Perform monitor network traffic

409 — Transmit notification for list of UEs matching grouping criteria

410 — Perform alternative embodiment

411 — Receive N4 PFD management request

412 — Receive request to detect service data flow

413 — Transmit notification for list of UEs matching super-set PFD

FIG. 4

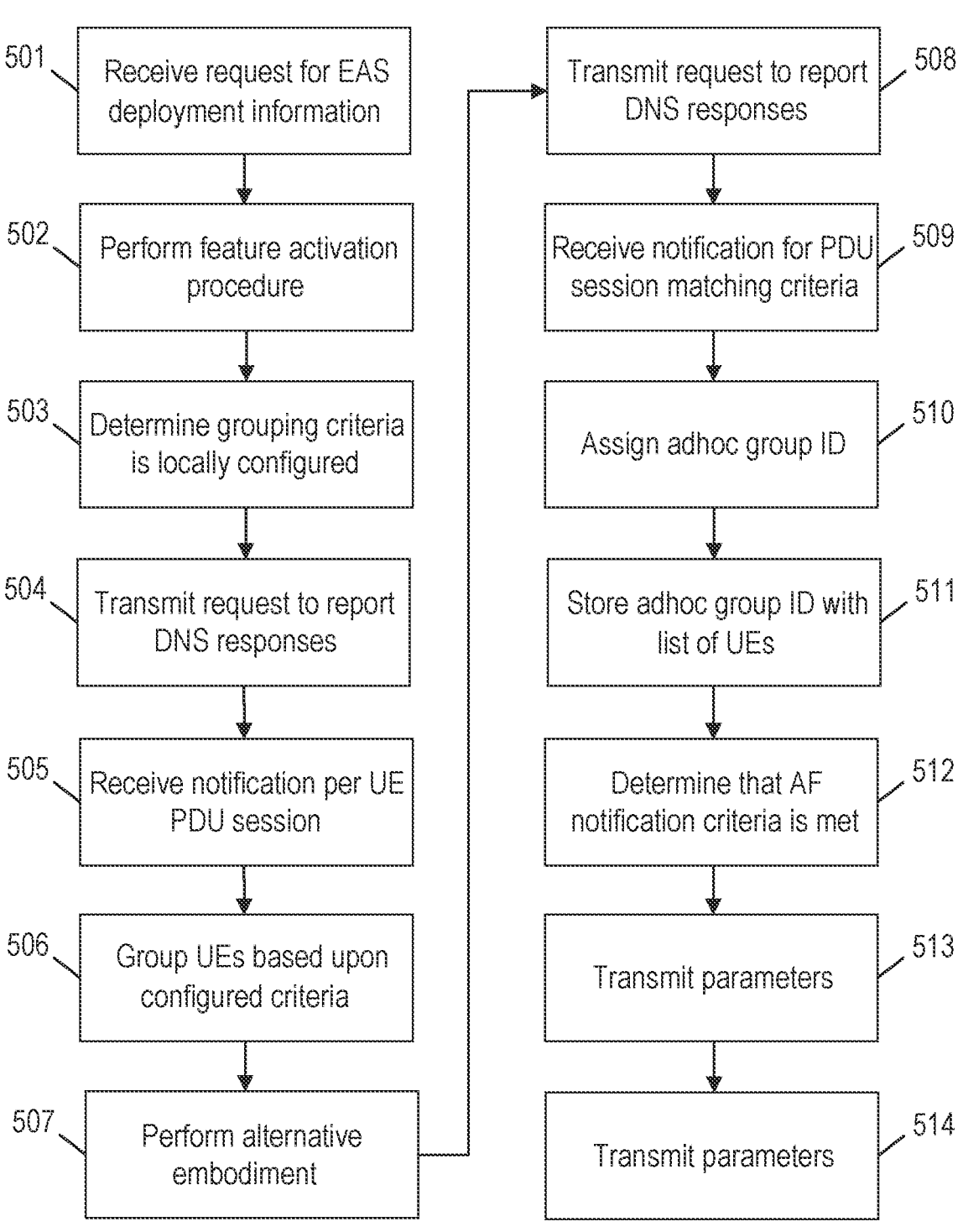

501 — Receive request for EAS deployment information

502 — Perform feature activation procedure

503 — Determine grouping criteria is locally configured

504 — Transmit request to report DNS responses

505 — Receive notification per UE PDU session

506 — Group UEs based upon configured criteria

507 — Perform alternative embodiment

508 — Transmit request to report DNS responses

509 — Receive notification for PDU session matching criteria

510 — Assign adhoc group ID

511 — Store adhoc group ID with list of UEs

512 — Determine that AF notification criteria is met

513 — Transmit parameters

514 — Transmit parameters

FIG. 5

601 — Perform feature activation procedure

602 — Receive request to report DNS responses

603 — Transmit notification per UE's PDU session

604 — Perform alternative procedure

605 — Receive request to report DNS responses

606 — Transmit notification for any PDU session for any UE matching criteria

1

FIFTH GENERATION CORE ENHANCEMENTS TO SUPPORT AD HOC AND DYNAMIC GROUP BASED SERVICES FOR EDGE DEPLOYMENTS

TECHNICAL FIELD

Some example embodiments may generally relate to mobile or wireless telecommunication systems, such as $3^{rd}$ Generation Partnership Project (3GPP) Long Term Evolution (LTE), $5^{th}$ generation (5G) radio access technology (RAT), new radio (NR) access technology, $6^{th}$ generation (6G), and/or other communications systems. For example, certain example embodiments may relate to systems and/or methods for creating implicit ad hoc groups of user equipment (UE) based upon specific criteria.

BACKGROUND

Examples of mobile or wireless telecommunication systems may include radio frequency (RF) 5G RAT, the Universal Mobile Telecommunications System (UMTS) Terrestrial Radio Access Network (UTRAN), LTE Evolved UTRAN (E-UTRAN), LTE-Advanced (LTE-A), LTE-A Pro, NR access technology, and/or MulteFire Alliance. 5G wireless systems refer to the next generation (NG) of radio systems and network architecture. A 5G system is typically built on a 5G NR, but a 5G (or NG) network may also be built on E-UTRA radio. It is expected that NR can support service categories such as enhanced mobile broadband (eMBB), ultra-reliable low-latency-communication (URLLC), and massive machine-type communication (mMTC). NR is expected to deliver extreme broadband, ultra-robust, low-latency connectivity, and massive networking to support the Internet of Things (IoT). The next generation radio access network (NG-RAN) represents the radio access network (RAN) for 5G, which may provide radio access for NR, LTE, and LTE-A. It is noted that the nodes in 5G providing radio access functionality to a user equipment (e.g., similar to the Node B in UTRAN or the Evolved Node B (eNB) in LTE) may be referred to as next-generation Node B (gNB) when built on NR radio, and may be referred to as next-generation eNB (NG-eNB) when built on E-UTRA radio.

SUMMARY

In accordance with some example embodiments, a method may include forming, by a session management function, at least one ad-hoc group of user equipment based upon detecting user equipment matching at least one grouping criteria. The method may further include reporting, by the session management function, the forming of the at least one ad-hoc group to a network exposure function or an application function based upon at least one notification condition.

In accordance with certain example embodiments, an apparatus may include means for forming at least one ad-hoc group of user equipment based upon detecting user equipment matching at least one grouping criteria. The apparatus may further include means for reporting the forming of the at least one ad-hoc group to a network exposure function or an application function based upon at least one notification condition.

In accordance with various example embodiments, a non-transitory computer readable medium may include program instructions that, when executed by an apparatus, cause the apparatus to perform at least a method. The method may include forming at least one ad-hoc group of user equipment based upon detecting user equipment matching at least one grouping criteria. The method may further include reporting the forming of the at least one ad-hoc group to a network exposure function or an application function based upon at least one notification condition.

In accordance with some example embodiments, a computer program product may perform a method. The method may include forming at least one ad-hoc group of user equipment based upon detecting user equipment matching at least one grouping criteria. The method may further include reporting the forming of the at least one ad-hoc group to a network exposure function or an application function based upon at least one notification condition.

In accordance with certain example embodiments, an apparatus may include at least one processor and at least one memory storing instructions that, when executed by the at least one processor, cause the apparatus at least to form at least one ad-hoc group of user equipment based upon detecting user equipment matching at least one grouping criteria. The at least one memory and instructions, when executed by the at least one processor, may further cause the apparatus at least to report the forming of the at least one ad-hoc group to a network exposure function or an application function based upon at least one notification condition.

In accordance with various example embodiments, an apparatus may include forming circuitry configured to form at least one ad-hoc group of user equipment based upon detecting user equipment matching at least one grouping criteria. The apparatus may further include reporting circuitry configured to report the forming of the at least one ad-hoc group to a network exposure function or an application function based upon at least one notification condition.

In accordance with some example embodiments, a method may include receiving, from a session management function, at least one domain name system response matching at least one of: at least one specific fully qualified domain name or at least one edge application server internet protocol address for at least one protocol data unit session of at least one user equipment that matches the configured criteria. The method may further include transmitting, to the session management function, a notification for the at least one protocol data unit session of at least one user equipment that matches the configured criteria.

In accordance with certain example embodiments, an apparatus may include means for receiving at least one domain name system response matching at least one of: at least one specific fully qualified domain name or at least one edge application server internet protocol address for at least one protocol data unit session of at least one user equipment that matches the configured criteria. The apparatus may further include means for transmitting a notification for the at least one protocol data unit session of at least one user equipment that matches the configured criteria.

In accordance with various example embodiments, a non-transitory computer readable medium may include program instructions that, when executed by an apparatus, cause the apparatus to perform at least a method. The method may include receiving at least one domain name system response matching at least one of: at least one specific fully qualified domain name or at least one edge application server internet protocol address for at least one protocol data unit session of at least one user equipment that matches the configured criteria. The method may further include transmitting a notification for the at least one protocol data unit session of at least one user equipment that matches the configured criteria.

In accordance with some example embodiments, a computer program product may perform a method. The method may include receiving at least one domain name system response matching at least one of: at least one specific fully qualified domain name or at least one edge application server internet protocol address for at least one protocol data unit session of at least one user equipment that matches the configured criteria. The method may further include transmitting a notification for the at least one protocol data unit session of at least one user equipment that matches the configured criteria.

In accordance with certain example embodiments, an apparatus may include at least one processor and at least one memory storing instructions that, when executed by the at least one processor, cause the apparatus at least to receive at least one domain name system response matching at least one of: at least one specific fully qualified domain name or at least one edge application server internet protocol address for at least one protocol data unit session of at least one user equipment that matches the configured criteria. The at least one memory and instructions, when executed by the at least one processor, may further cause the apparatus at least to transmit a notification for the at least one protocol data unit session of at least one user equipment that matches the configured criteria.

In accordance with various example embodiments, an apparatus may include receiving circuitry configured to receive at least one domain name system response matching at least one of: at least one specific fully qualified domain name or at least one edge application server internet protocol address for at least one protocol data unit session of at least one user equipment that matches the configured criteria. The apparatus may further include transmitting circuitry configured to transmit a notification for the at least one protocol data unit session of at least one user equipment that matches the configured criteria.

BRIEF DESCRIPTION OF THE DRAWINGS

For a proper understanding of example embodiments, reference should be made to the accompanying drawings, wherein:

FIGS. 2A-B illustrate an example of a signaling diagram of an edge application server discovery function-based according to some example embodiments;

FIG. 3 illustrates an example of a flow diagram of a UPF-based method performed by a SMF according to various example embodiments;

FIG. 4 illustrates an example of a flow diagram of another UPF-based method performed by a UPF according to certain example embodiments;

FIG. 5 illustrates an example of a flow diagram of an EASDF-based method performed by an SMF according to some example embodiments;

DETAILED DESCRIPTION

Figure 1A:
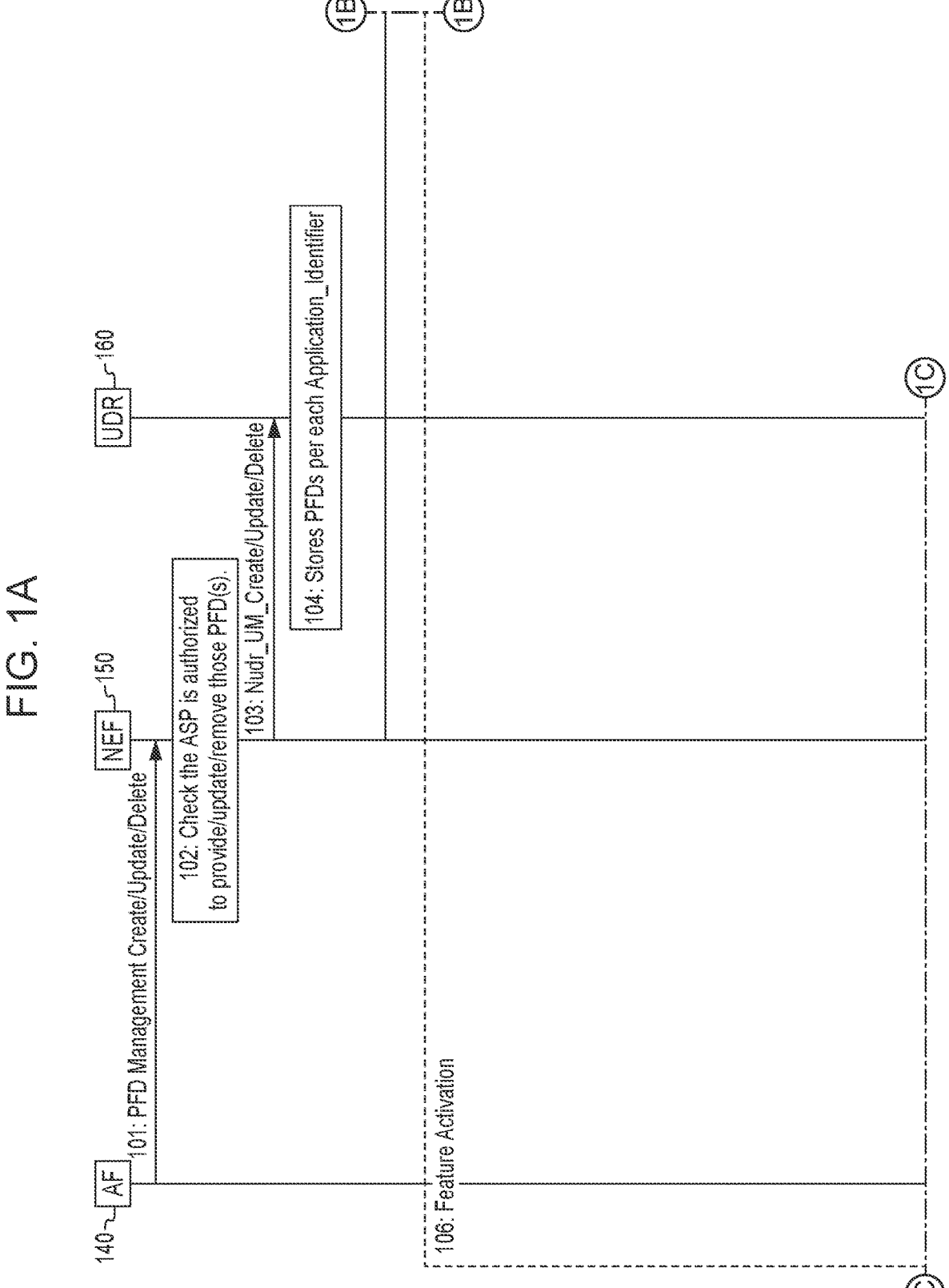
FIGS. 1A-D illustrate an example of a signaling diagram of a user plane function-based approach according to certain example embodiments.
Figure 1B:
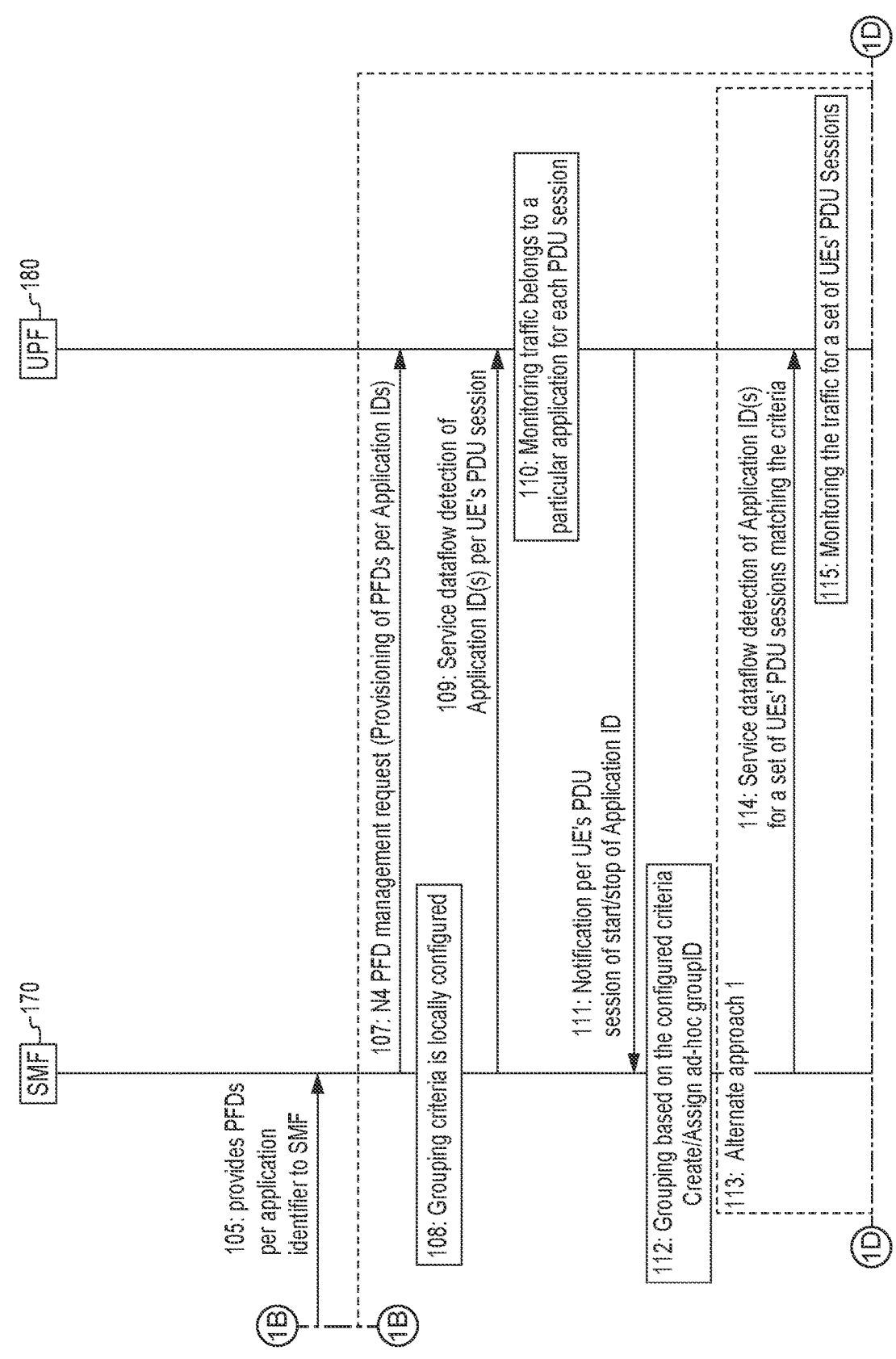
Figure 1C:
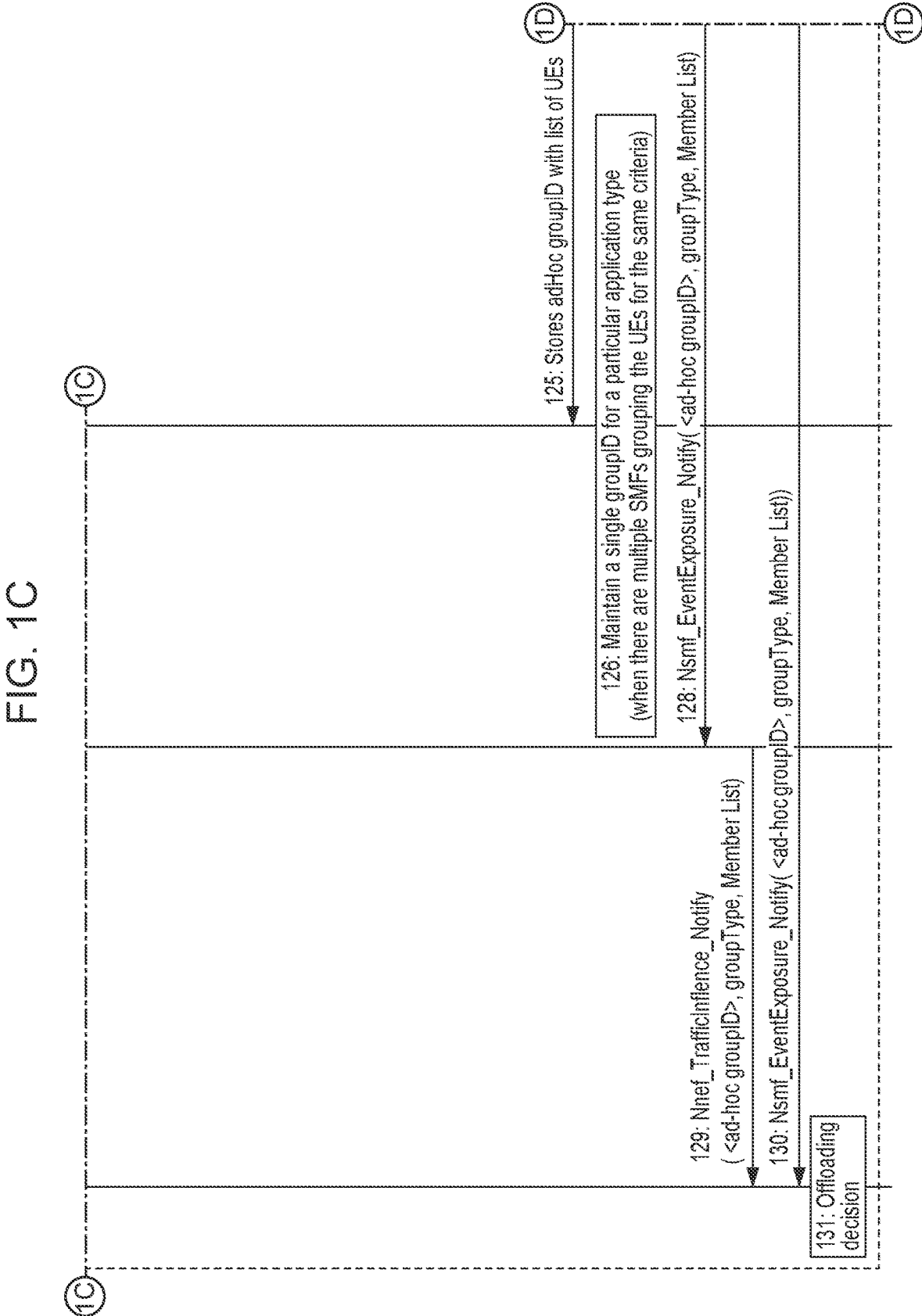
Figure 1D:
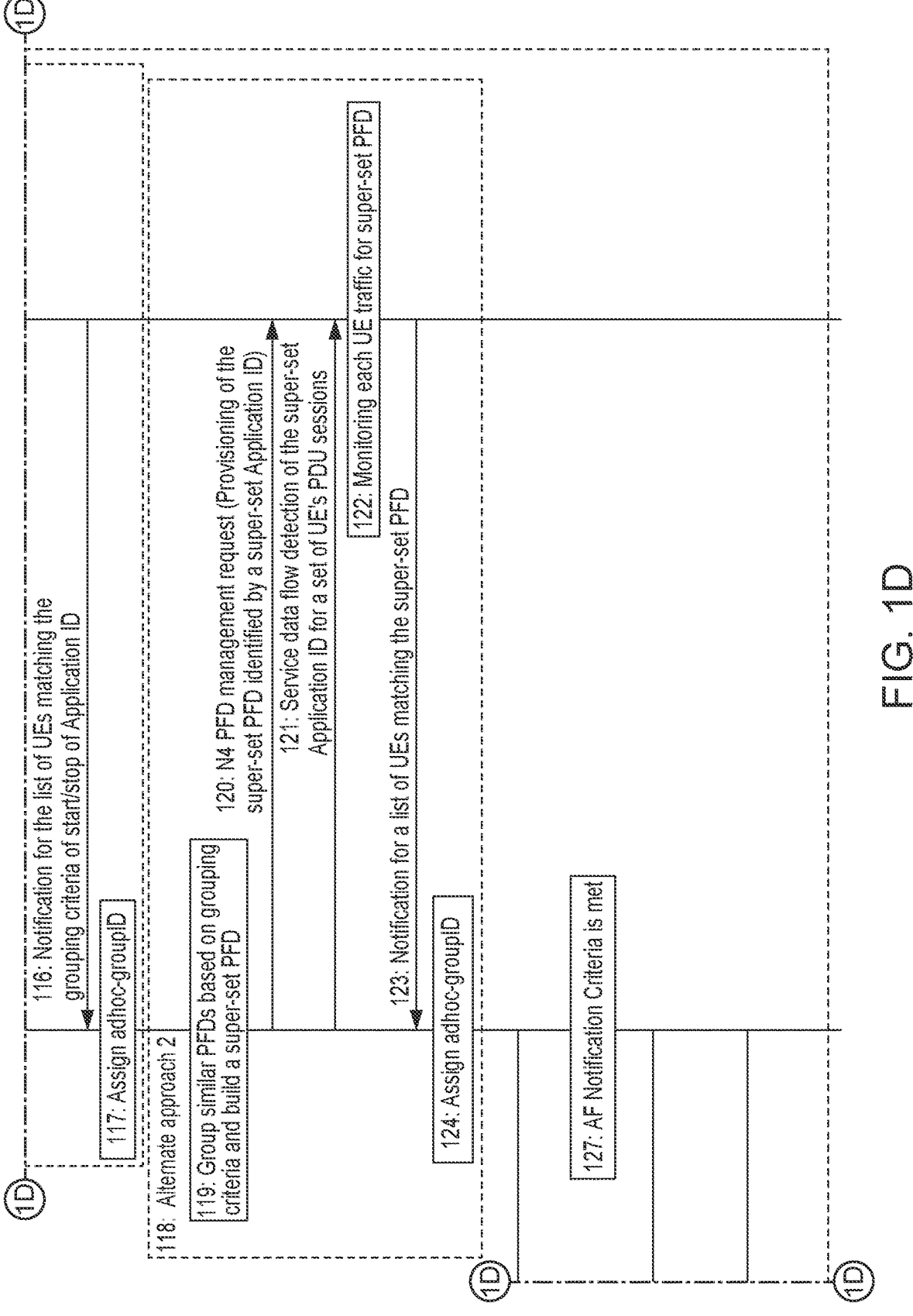

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for implicit ad hoc groups of UE based upon specific criteria is not intended to limit the scope of certain example embodiments, but is instead representative of selected example embodiments.

In a distributed computing architecture, such as edge computing, operators may be able to host their own and/or third-party applications, as well as content close to the user. The UE may access the application/content via a RAN and locally deployed user plane function (UPF), thus fulfilling expectations on the end-to-end user experience, allowing low latency to the edge applications, and allowing heavy traffic to be offloaded from a backbone network to the edge.

Some existing techniques allow an application function (AF) to provide traffic offloading rules that target at least one UE. In particular, an AF may send requests to influence session management function (SMF) routing decisions for protocol data unit (PDU) session traffic. The AF requests may influence UPF (re) selection and intermediate (I-) SMF (re) selection, and allow routing of user traffic to a local access to a data network (identified by a data network access identifier (DNAI)). The AF may issue requests on behalf of applications that may not be owned by the public land mobile network (PLMN) serving the UE. If the operator does not allow an AF to access the network directly, the AF may use the network exposure function (NEF) to interact with the fifth generation core (5GC).

With respect to the AF influencing traffic routing, the AF may provide an optional indication of traffic correlation, when information identifies a group of UEs. This implies that targeted PDU sessions may be correlated by a common DNAI in the user plane for the traffic. If this indication is provided by the AF, the 5GC may select a common DNAI for the target PDUs sessions from the list of DNAI(s). This may ensure that the same edge application server (EAS) may be used to serve all members of a pre-defined group, which may be served by the same SMF and/or a particular 5G VN Group. This is one of the restrictions in Release-17 specifications.

In particular, information on the UE may correspond to individual UEs identified using a generic public subscription identifier (GPSI), an IP address/prefix, or a medium access control (MAC) address; groups of UEs identified by an external group identifier when the AF interacts via the NEF, internal-group identifier when the AF interacts directly with the PCF; and/or any UE accessing the combination of data name network (DNN), single network slice selection assistance information (S-NSSAI), and DNAI(s).

Regarding information to identify the traffic, the traffic may be identified in the AF request by any of: either a DNN and possibly slicing information (e.g., S-NSSAI) or an AF-Service-Identifier; when the AF provides an AF-Service-Identifier (i.e., an identifier of the service) on behalf of which the AF is issuing the request, the 5G core maps this identifier into a target DNN and slicing information (S-NSSAI); when the NEF processes the AF request the AF-Service-Identifier may be used to authorize the AF request;

an application identifier or traffic filtering information (e.g., 5 tuple) referring to an application handling UP traffic and is used by the UPF to detect the traffic of the application; when the AF request is for influencing SMF routing decisions, the information is to identify the traffic to be routed; and/or when the AF request is for subscription to notifications about UP path management events, the information is to identify the traffic that the events relate to.

Potential locations of applications towards which the traffic routing may also apply. The potential location of application may be expressed as a list of DNAI(s). If the AF interacts with the PCF via the NEF, the NEF may map the AF-Service-Identifier information to a list of DNAI(s). The DNAI(s) may be used for UPF (re) selection and (I) SMF (re) selection.

A packet flow description (PFD) may include a set of information enabling the detection of application traffic. For example, each PFD may be identified by a PFD ID. A PFD ID may be unique in the scope of a particular application identifier. Some existing techniques define some conditions for when a PFD ID is included in the PFD. A PFD may include a PFD ID and any of the following information: a 3-tuple including protocol, server-side IP address (EAS IP@)) and port number; the significant parts of the URL to be matched (e.g., host name; and/or a domain name matching criteria and information about applicable protocol(s)).

Various procedures may describe how application detection is done with the PFD. For example, an application service provider (ASP) may provide individual PFDs or the full set of PFDs for each application identifier maintained by the ASP to the SMF via the PFD management service in the NEF (packet flow description function (PFDF)). These PFDs may become part of the application detection filters in the SMF/UPF, and therefore may be used as part of the logic to detect traffic generated by an application. Upon reception of the request from the ASP, the NEF (PFDF) may check if the ASP is authorized to provide/update/remove those PFD (s). For the usage of this new solution, existing charging principles could be applied (left to implementation). NEF may store PFDs in UDR via Nudr_UM_Create/Update/ Delete. UDR updates the list of PFDs against each application identifier (e.g., <Data Subset=PFD>, <Data Key=Application Identifier>). NEF may provide PFDs per application identifier to SMF on the request of SMF (pull mode) or on the request of PFD management from NEF (push mode) (i.e., management of packet flow descriptions). The SMF may send a N4 PFD management request to the UPF to provision the PFD(s) corresponding to application identifiers. The UPF may update the PFDs accordingly. As an additional point, the UPF may perform packet inspection e.g., application detection based on service data flow template and the optional PFDs received from the SMF in addition.

Regarding service data flow detection, the service data flow detection may use the service data flow template included in a PCC rule provided by the PCF. The service data flow template defines the data for the service data flow detection as a set of service data flow filters or an application identifier referring to an application detection filter. In various techniques, the SMF maps the service data flow template in the PCC rule into the detection information in a packet detection rules to the UPF.

It is noted that the application detection filters provided to the SMF may be extended with the PFDs provided by the NEF (PFDF). For example, some existing techniques describe how the SMF uses the service data flow detection capabilities in the UPF.

In order to provide notification of user plane management events, the SMF may send a notification to the AF if the AF had subscribed to user plane management event notifications, such as a PDU session anchor identified in the AF subscription request being established or released; a DNAI changing; and the SMF may have received a request for AF notification, and the on-going PDU session may meet the conditions to notify the AF; and a Ethernet PDU session anchor relocation. The SMF may use notification reporting information received from PCF to issue the notification either via an NEF or directly to the AF.

It may be desirable to develop a solution to the influence of protocol data unit session anchor (PSA)-UPF and EAS (re) location for collection of UEs (e.g., in scenarios when UE(s) should use the same EAS and are not already members of a pre-defined group). This may include defining a collection of UEs or a list of UEs forming a dynamic ad-hoc group that should use the same EAS and/or same local part of DN and/or same DNAI, and/or same PSA-UPF, and how the collection is identified. In particular, it may be desirable to define how the 5GC forms a dynamic ad hoc group of a collection of UEs that could be subject to collective and common treatment. Furthermore, it may be beneficial to define how to influence UPF and EAS (re) location for a collection of UEs that should use the same EAS and/or same local part of DN and/or same DNAI. In addition, it may be beneficial to define how to decide on a common local part of DN for the collection of UEs, and, for a given collection of UEs defined in the above, whether and how to determine if any UE in this collection have no access to EAS or local part of DN, and whether and how to define any specific treatments for such UE if any. Finally, it may be beneficial to define how to handle coordination of the UPF(s) and EAS (re) location for collections of UEs.

Certain example embodiments described herein may have various benefits and/or advantages to overcome the disadvantages described above. For example, certain example embodiments may enable a SMF to create an ad-hoc group based on real-time data. This may not be based on an AF request and/or any subscription-based (UDR) inputs. An SMF may report any updates to the group (e.g., add or remove certain UE(s) from the group due to PSA-UPF change of a particular UE) with the group information (e.g., ad-hoc group ID, member list, etc.) in a UDR. In addition, the SMF may report any updates to the group (i.e., add or remove certain UE from the group due to PSA-UPF change of a particular UE) to NEF/AF. When the UE is subscribed to multiple applications (UE belongs to multiple application group IDs), the SMF may be subscribed to PFD services. The SMF may be in a better position to realize that a particular UE belongs to one/several application groups, or a new application service has been started/stopped in UE. When an application group is newly added/removed, since the SMF is subscribed to NEF PFD management, the SMF may be notified for the same with no need to receive the ad-hoc group update from UDR. AF offloading may be performed based on resource usages as mentioned in usage reporting, N-SSAID, threshold limits, improving flexibility, etc. The notification generated from the UPF may not only include details about application types, but may also have details about policy control and usage monitoring purposes. Thus, certain example embodiments discussed below are directed to improvements in computer-related technology.

Figure 7:
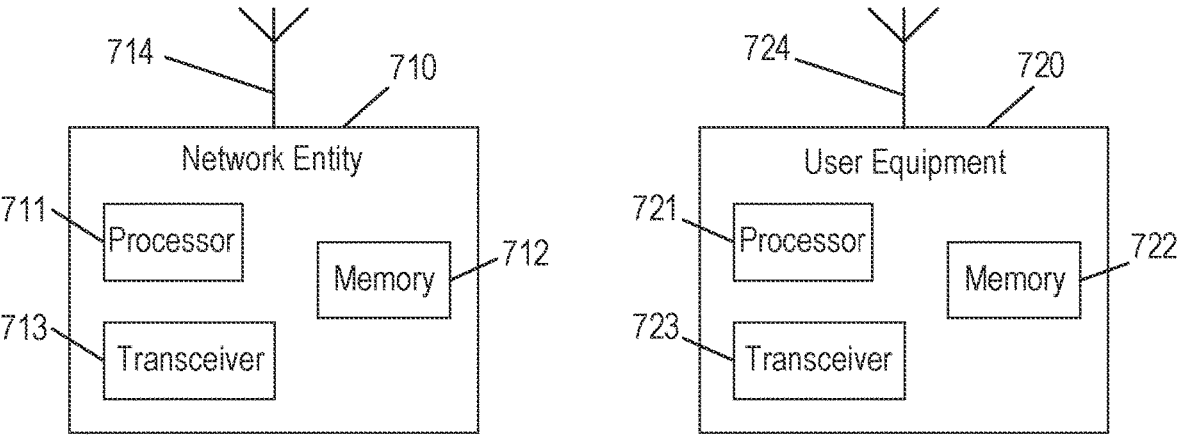
FIG. 7 illustrates an example of various network devices according to certain example embodiments.

FIG. 1 illustrates an example of a signaling diagram depicting enabling a SMF to create, modify and delete an implicit ad hoc group of UEs based on specific criteria. The SMF may also report it to an AF based on AF notification criteria, thus allowing the AF to make an offloading decision later. AF 140, NEF 150, UDR 160, SMF 170, and UPF 180 may be similar to NE 710, as illustrated in FIG. 7, according to certain example embodiments.

In various example embodiments, a group ID may be determined by SMF 170, and NEF 150, UDR 160, or a unified data manager (UDM) (not shown) may be used to ensure the uniformity of the group ID even though multiple SMFs are involved for the same dynamic group. For example, this may define how SMF 170 can determine some UE/PDU sessions relate to an ad hoc group related with UE(s) using the same application (instance), using UPF 180 and/or an edge application server discovery function (EASDF) (not shown). Certain example embodiments may allow SMF 170 to form an ad hoc group of all UEs using the same PSA-UPF or same PSA-UPF+same application, etc. As a result, AF 140 would not need to provide such criteria to 5GC.

At 101, AF 140 may transmit to NEF 150 a PFD management create/update/delete indication.

At 102, NEF 150 may check if an ASP is authorized to provide/update/remove PFD(s) indicated by AF 140.

At 103, NEF 150 may transmit to UDR 160 a Nudr_UM_Create Update Delete message.

In response to receiving the Nudr_UM_Create Update Delete message at 103, at 104, UDR 160 may store PFDs per each Application_Identifier.

At 105, NEF 150 may provide to SMF 170 PFDs per each Application_Identifier. For example, triggering criteria may be transmitted to SMF 170, such as a feature flag with extended parameters for the grouping category as mentioned below in grouping criteria at 108. Alternatively, this functionality may also be triggered by providing the grouping criteria from AF 140 to SMF 170.

A feature activation procedure may begin at 106. For example, at 107, SMF 170 may transmit to UPF 180 an N4 PFD management request, which may provision PDFs per application ID.

At 108, SMF 170 may group UEs based on a set of criteria (e.g., GroupwithSameApplicationType, GroupWithsameEAS) received from other entities and/or locally configured. For example, SMF 170 may group UEs based on a set of criteria such as tracking area where UEs are located, cell ID where UEs are located, location coordinates (e.g., all UEs within TAI-1 and/or TAI-2, . . . ); all users served by the same entity (e.g., served by the same PSA-UPF+same Edge Application Server (EAS-1) with a specific application running; UPF serving the UE (e.g., group defined based on UE being served by the same PSA-UPF); and UEs that are served in same local part of DN/DNAI. A combination of properties with respect to group membership definition can also be provided. In addition, a single UE may be part of multiple ad-hoc groups (e.g., group-A for multi-user gaming, group-B for time sync, group-C for V2X/platoon, etc.). At 109, SMF 170 may transmit to UPF 180 requests to detect certain service data flows and/or application IDs, one request per UE's PDU session. For example, SMF 170 may instruct UPF 180 to monitor and report each UE's PDU session starting or stopping to use one or more particular applications. SMF 170 may instruct UPF 180 by configuring a PFCP session for the UE's PDU session with PDRs identifying the related Application IDs. SMF 170 may provision PFD rules at UPF 180 for all UEs to let UPF 180 know the traffic filters to apply for a specific application identified by an application ID. If so, UPF 180 may look up for the PFDs corresponding to the application IDs received in the SMF 170 instruction (PDRs) to determine the traffic to detect and report.

In various example embodiments may include a notification of user plane management events, whereby SMF 170 may send a notification to AF 140 if AF 140 had subscribed to user plane management event notifications. SMF 170 may additionally provide to AF 140 information indicating the ad hoc group ID to which this UE is added to. Additionally, SMF 170 may also provide the list of UEs belonging to a particular ad hoc group (i.e., identified by a particular ad hoc group ID). Such events may include a PDU session anchor identified in a subscription request by AF 140 may have been established or released; a DNAI may have changed; SMF 170 may have received a request for AF 140 notification and the on-going PDU session meets the conditions to notify AF 140; and Ethernet PDU session anchor relocation may have been received.

At 110, UPF 180 may monitor traffic belonging to specific service data flows and/or particular applications per UEs' PDU session, for each UE's PDU session for which such a request has been received from the SMF.

At 111, UPF 180 may transmit to SMF 170 a notification per UE's PDU session of start/stop of application ID. For example, UPF 180 may generate a notification as per instructions of SMF 170 whenever UPF 180 detects that a PDU session starts or stops using the respective service data flows and/or applications.

At 112, SMF 170 may perform grouping of UEs based upon criteria configured at 108 and the notifications received from UPF 180, which may result in creating/assigning a new ad-hoc groupID if this is the first UE matching the grouping criteria. In particular, SMF 170 may form an ad-hoc group of UEs based on any of the configured criteria at 108, such as all UEs using same PSA-UPF, same PSA-UPF +same application, etc. SMF 170 may assign an adhoc-group ID for the same. Once SMF 170 receives the notification from UPF 180 for each PDU session, SMF 170 may group corresponding UEs based on the grouping criteria.

Certain example embodiments may include multiple SMFs deployment. Specifically, different SMFs serving different UE's PDU sessions may end up forming an ad-hoc group for the same set of criteria and may be supported by a $2^{nd}$ NF (e.g., UDR 160, UDM, NEF 150) coordinating the ad-hoc group ID created by each SMF (i.e., SMF 170).

In some example embodiments, SMF 170 may form the ad-hoc group of UEs based on detecting UEs' PDU sessions starting or stopping to use one or more specific applications identified by their application IDs.

An alternative embodiment may be performed at 113. For example, at 114, SMF 170 may transmit to UPF 180 a request to detect certain service data flows and/or application IDs for a set of UE PDU sessions matching the criteria (i.e., a single request for a set of UEs' PDU sessions). At 115, UPF 180 may perform monitor network traffic for a set of UEs' PDU sessions, as instructed by SMF 170. At 116, UPF 180 may transmit to SMF 170 a notification for a list of UEs matching the grouping criteria (e.g., of start/stop of service data flows and/or application IDs). The notification may indicate the list of UE's PDU sessions matching the grouping criteria. At 117, SMF 170 may assign adhoc-groupIDs.

In various example embodiments, the UPF may detect UE's PDU sessions starting or stopping to use one or more specific applications identified by their Application IDs (and described by corresponding PFDs). For example, the PFD may have 3 tuple which includes server-IP address (EAS IP@). When SMF 170 groups the multiple UEs based on PFDs, this grouping may ensure that an ad-hoc group is always served by same EAS. A PFD may include information such as PFD ID, and one or more of a 3-tuple including protocol, server-side IP address (EAS IP@)) and port number; the significant parts of the URL to be matched (e.g., host name); and a domain name matching criteria and information about applicable protocols.

An alternative embodiment may be performed at 118. For example, at 119, SMF 170 may group PFDs based on grouping criteria, and build a super-set PFD. At 120, SMF 170 may transmit to UPF 180 an N4 PFD management request (e.g., provisioning of the super-set PFD identified by a super-set application ID). At 121, SMF 170 may transmit to UPF 180 a request to detect service data flows of the super-set application ID for a set of UE PDU sessions. At 122, UPF 180 may monitor traffic for each UE's PDU session for the super set PFDs. At 123, UPF 180 may transmit to SMF 170 a notification for a list of UEs matching the super-set PFD. At 124, SMF 170 may assign the adhoc-groupID.

Specifically, SMF 170 may instruct UPF 180 to monitor and report any PDU session of any UE possibly matching certain criteria (e.g., a specific S-NSSAI and DNN) starting or stopping to use one or more specific applications identified by their application IDs (i.e., matching the corresponding PFDs). SMF 170 may also optionally group the similar PFD's based on grouping criteria and build a super set of PFDs and share it with UPF 180. UPF 180 may send a notification which contains the list of UE's matching the aforementioned criteria and applications (e.g., or the super set of PFD rule set (combination of multiple PFD rule set)). Once SMF 170 receives notification from UPF 180, SMF 170 may assign an adhoc-group ID for the same.

At 125, SMF 170 may transmit UDR 160 an instruction to store the ad-hoc groupIDs with a list of UEs.

At 126, UDR 160 may maintain a single groupID for a particular application type (e.g., when there are multiple SMFs grouping the UEs for the same criteria).

At 127, SMF 170 may determine that AF notification criteria has been met.

At 128, SMF 170 may transmit to UDR 160 Nsmf_EventExposure_Notify (<ad-hoc groupID>, groupType, Member list>).

At 129, NEF 150 may transmit to AF 140 a Nnef_TrafficInflence_Notify (<ad-hoc groupID>, groupType, Member List>).

At 130, SMF 170 may transmit to AF 140 an Nsmf_EventExposure_Notify (<ad-hoc groupID>, groupType, Member List). In particular, SMF 170 may use notification reporting information received from PCF to issue the notification either via NEF 150 directly to AF 140.

At 131, AF 140 may perform an offloading decision.

In some example embodiments, the same ad-hoc group ID can be maintained across SMFs which are grouping the UEs for the same selection criteria with the help of UDR 160/UDM. For example, if there is SMF1, SMF2, and SMF3 (which are grouping the set of UEs for the same group criteria), SMF1 may store the ad-hoc group ID, and corresponding group members/UEs ID in the UDR 160 (via UDM). SMF2 and SMF3 may search and retrieve this application ID from the UDM, and possibly also add new group members. In case of a race condition, the UDR may choose the least group ID amongst the notifications from multiple SMFs.

In various example embodiments, each UE associated with the ad-hoc group may be implicitly served in same local part of DN/DNAI. For example, traffic influence requests may be sent by AF 140 towards a PCF (through N5 interface or via NEF 150) for PFD profiles created in the PCF. AF 140 may register for DNAI change notifications through the TrafficInfluence request API. Traffic influence requests may be consumed by PCF or UDR based on the requested information. If there is a location change event, the UE may initiate the PDU session modification procedure towards SMF 170. Alternatively, the PCF may initiate a network-initiated PDU session modification request procedure towards SMF 170 because of a traffic influence request generated by AF 140. SMF 170 may push this updated PFD profiles to UPF. Whenever there is a new UPF deployed in 5G network or a new DN service is started on an existing UPF, UEs belonging to the existing group may be moved to a new group based on the grouping criteria. For example, if the group criteria is based on PSA-UPF, when there is a new PSA-UPF, the UEs which were part of a different group ID and are now serviced by this new PSA-UPF, may form a new group. SMF 170 may generate a trigger to AF accordingly. In various example embodiments of the management of PFDs in the SMF, an application identified by an application detection filter in the UPF may deploy a new server or a reconfiguration occurs in the ASP network which impacts the application detection filters of that particular application.

FIG. 2 illustrates an example of a signaling diagram depicting enabling a SMF to create, modify and delete an implicit ad hoc group of UEs based on specific criteria. The SMF may also report it to an AF based on AF notification criteria, thus allowing the AF to make an offloading decision later. AF 240, NEF 240, UDR 260, SMF 270, and EASDF 280 may be similar to NE 710, as illustrated in FIG. 7, according to certain example embodiments.

At 201, AF 220 may transmit to NEF 250 EAS deployment information. At 202, NEF 250 may then store the EAS deployment information at UDR 260.

At 203, NEF 250 may request EAS deployment information from SMF 270. As an example, SMF 270 may retrieve EAS deployment information (per application identifier) from NEF 250 (key: DNN/S-NSSAI). This EAS deployment information may be provided by AF 240 to NEF 250 which may store it in UDR 260 in a format, such as <EAS Deployment information>, <DNN or S-NSSAI>, <Application Identifier and/or internal group-Identifier>. SMF 270 may retrieve the EAS deployment information from NEF 250, and configure the DNS handling rules to EASDF 280, correspondingly. SMF 270 may configure EASDF 280 to retrieve information about DNS responses related with some applications. From the DNS responses, SMF 270 may be able to determine which UEs may be configured to use specific EAS IP address (for a specific application). Based on the received DNS response, SMF 270 may decide to insert or relocate a PSA-UPF (not shown) used by a PDU session.

At 204, a feature activation procedure may be performed. For example, at 205, SMF 270 may determine that grouping criteria is locally configured.

At 206, SMF 270 may transmit to EASDF 280 a request, per UE's PDU session, to report DNS queries and DNS responses matching one or more specific fully qualified domain names (FQDNs) in the DNS query and/or EAS IP addresses in the DNS response. In an example embodiment, SMF 270 may interact with EASDF 280 to form a dynamic ad hoc group of a collection of UEs that could be subject to collective and common treatment. For example, based on the DNS response messages provided by EASDF 280 to SMF 270, in order to learn the list of UEs associated with same edge application server and/or if SMF 250 decides based on DNS response message to use specific PSA-UPF and/or DNAI for multiple UEs.

At 207, EASDF 280 may transmit to SMF 270 a notification per UE's PDU session when such DNS responses are received.

At 208, SMF 270 may group UEs based upon the configured criteria and the notifications received from the EASDF, and/or assign ad-hoc groupID. For example, SMF 270 may instruct EASDF 280 to report DNS queries and DNS responses matching one or more specific FQDNs and/or a request to report DNS response matching specific EAS IP addresses. EASDF 280 may notify SMF 270 per UE's PDU session when such DNS response is received. Once SMF 270 receives the notification from EASDF 280 for each PDU session, SMF 270 may group them based on the grouping criteria.

In various example embodiments, SMF 270 may group UEs based on the current location (e.g., tracking area) of the UEs it is serving.

At 209, an alternative approach may be performed. Specifically, at 210, SMF 270 may transmit to EASDF 280 a request to report DNS queries matching one or more specific FQDNs and/or a request to report DNS response matching specific EAS IP addresses for any PDU session for any UE matching criteria (i.e., a single request is sent for a set of PDU sessions). At 211, EASDF 280 may transmit to SMF 270 a notification for any PDU session of any UE possibly matching certain criteria, optionally with the identity of such UE's PDU sessions, when such DNS response is received. At 212, SMF 260 may assign an adhoc-group ID to that UE.

In some example embodiments, SMF 270 may instruct EASDF 280 to report DNS queries and DNS responses matching one or more specific FQDNs and/or a request to report DNS response matching specific EAS IP addresses for any PDU session of any UE possibly matching certain criteria (e.g., a specific S-NSSAI and DNN). Once SMF 270 receives notification from EASDF 280, SMF 270 may assign an adhoc-group ID for the same.

At 213, SMF 270 may store at UDR 260 the adhoc-groupID with a list of UEs.

At 214, UDR 260 may maintain a single groupID for a particular application type (e.g., when there are multiple SMFs grouping the UEs for the same criteria).

At 215, SMF 270 may determine that AF notification criteria is met.

At 216, SMF 270 may transmit to NEF 250 a Nsmf_EventExposure_Notify (<ad-hoc groupID>, groupType, Member List). In particular, when the AF Notification Criteria (e.g., UE mobility/new PSA-UPF, DNAI change) is met, SMF 270 may send <ad-hoc groupID>+(optionally) <list of UEs>+<details> to NEF 250/AF 240. Subsequently, AF 240 may take offloading decision for the group of UEs.

At 217, NEF 250 may transmit to AF 240 a Nnef_TrafficInflence_Notify (<ad-hoc groupID>, groupType, Member List).

At 218, SMF 270 may transmit to AF 240 a Nsmf_EventExposure_Notify (<ad-hoc groupID, groupType, Member List).

At 219, AF 240 may perform an offloading decision.

FIG. 3 illustrates an example of a flow diagram of a method that may be performed by a SMF, such as NE 710 illustrated in FIG. 7, according to various example embodiments.

At step 301, the method may include receiving from an NEF PFDs per each Application_Identifier. For example, triggering criteria may be received from the NEF, such as a feature flag with extended parameters for the grouping category as mentioned below in grouping criteria at 304. Alternatively, this functionality may also be triggered by providing the grouping criteria from an AF to the SMF.

At step 302, the method may include beginning a feature activation procedure. For example, at step 303, the method may include transmitting to a UPF an N4 PFD management request, which may provision PDFs per application ID.

At step 304, the method may include grouping UEs based on a set of criteria (e.g., GroupwithSame ApplicationType, GroupWithsameEAS) received from other entities and/or locally configured. For example, the SMF may group UEs based on a set of criteria such as tracking area where UEs are located, cell ID where UEs are located, location coordinates (e.g., all UEs within TAI-1 and/or TAI-2, . . . ); all users served by the same entity (e.g., served by the same PSA-UPF+same Edge Application Server (EAS-1) with a specific application running; UPF serving the UE (e.g., group defined based on UE being served by the same PSA-UPF); and UEs that are served in same local part of DN/DNAI. A combination of properties with respect to group membership definition can also be provided. In addition, a single UE may be part of multiple ad-hoc groups (e.g., group-A for multi-user gaming, group-B for time sync, group-C for V2X/ platoon, etc.). At step 305, the method may include transmitting to the UPF requests to detect certain service data flows and/or application IDs, one request per UE's PDU session. For example, the SMF may instruct the UPF to monitor and report each UE's PDU session starting or stopping to use one or more particular applications. The SMF may instruct the UPF by configuring a PFCP session for the UE's PDU session with PDRs identifying the related Application IDs. The SMF may provision PFD rules at the UPF for all UEs to let the UPF know the traffic filters to apply for a specific application identified by an application ID. If so, the UPF may look up for the PFDs corresponding to the application IDs received in the SMF instruction (PDRs) to determine the traffic to detect and report.

In various example embodiments may include a notification of user plane management events, whereby the SMF may send a notification to the AF if the AF had subscribed to user plane management event notifications. The SMF may additionally provide to the AF information indicating the ad hoc group ID to which this UE is added to. Additionally, the SMF may also provide the list of UEs belonging to a particular ad hoc group (i.e., identified by a particular ad hoc group ID). Such events may include a PDU session anchor identified in a subscription request by the AF may have been established or released; a DNAI may have changed; the SMF may have received a request for the AF notification and the on-going PDU session meets the conditions to notify the AF; and Ethernet PDU session anchor relocation may have been received.

At step 306, the method may include receiving from the UPF a notification per UE's PDU session of start/stop of application ID. For example, the UPF may generate a notification as per instructions of the SMF whenever the UPF detects that a PDU session starts or stops using the respective service data flows and/or applications.

At step 307, the method may include performing grouping of UEs based upon criteria configured at step 304 and the notifications received from the UPF, which may result in creating/assigning a new ad-hoc groupID if this is the first UE matching the grouping criteria. In particular, the SMF may form an ad-hoc group of UEs based on any of the configured criteria at step 304, such as all UEs using same PSA-UPF, same PSA-UPF+same application, etc. The SMF may assign an adhoc-group ID for the same. Once the SMF receives the notification from the UPF for each PDU session, the SMF may group corresponding UEs based on the grouping criteria.

Certain example embodiments may include multiple SMFs deployment. Specifically, different SMFs serving different UE's PDU sessions may end up forming an ad-hoc group for the same set of criteria and may be supported by a $2^{nd}$ NF (e.g., UDR, UDM, NEF) coordinating the ad-hoc group ID created by each SMF (i.e., SMF).

In some example embodiments, the SMF may form the ad-hoc group of UEs based on detecting UEs' PDU sessions starting or stopping to use one or more specific applications identified by their application IDs.

An alternative embodiment may be performed at step 308. For example, at step 309, the method may include transmitting to the UPF a request to detect certain service data flows and/or application IDs for a set of UE PDU sessions matching the criteria (i.e., a single request for a set of UEs' PDU sessions). At step 310, the method may include receiving from the UPF a notification for a list of UEs matching the grouping criteria (e.g., of start/stop of service data flows and/or application IDs). The notification may indicate the list of UE's PDU sessions matching the grouping criteria. At step 311, the method may include assigning adhoc-group-pIDs.

In various example embodiments, the UPF may detect UE's PDU sessions starting or stopping to use one or more specific applications identified by their Application IDs (and described by corresponding PFDs). For example, the PFD may have 3 tuple which includes server-IP address (EAS IP@). When the SMF groups the multiple UEs based on PFDs, this grouping may ensure that an ad-hoc group is always served by same EAS. A PFD may include information such as PFD ID, and one or more of a 3-tuple including protocol, server-side IP address (EAS IP@)) and port number; the significant parts of the URL to be matched (e.g., host name); and a domain name matching criteria and information about applicable protocols.

An alternative embodiment may be performed at step 312. For example, at step 313, the method may include grouping PFDs based on grouping criteria, and build a super-set PFD. At step 314, the method may include transmitting to the UPF an N4 PFD management request (e.g., provisioning of the super-set PFD identified by a super-set application ID). At step 315, the method may include transmitting to the UPF a request to detect service data flows of the super-set application ID for a set of UE PDU sessions. At step 316, the method may include receiving a notification for a list of UEs matching the super-set PFD. At step 317, the method may include assigning the adhoc-groupID.

Specifically, the SMF may instruct the UPF to monitor and report any PDU session of any UE possibly matching certain criteria (e.g., a specific S-NSSAI and DNN) starting or stopping to use one or more specific applications identified by their application IDs (i.e., matching the corresponding PFDs). The SMF may also optionally group the similar PFD's based on grouping criteria and build a super set of PFDs and share it with the UPF. The UPF may provide a notification which contains the list of UE's matching the aforementioned criteria and applications (e.g., or the super set of PFD rule set (combination of multiple PFD rule set)). Once the SMF receives notification from the UPF, the SMF may assign a adhoc-group ID for the same.

At step 318, the method may include transmitting to the UDR an instruction to store the ad-hoc groupIDs with a list of UEs.

At step 319, the method may include determining that AF notification criteria has been met.

At step 320, the method may include transmitting to the UDR Nsmf_EventExposure_Notify (<ad-hoc groupID>, groupType, Member list>).

FIG. 4 illustrates an example of a flow diagram of a method that may be performed by a UPF, such as NE 710 illustrated in FIG. 7, according to various example embodiments.

At step 401, the method may include beginning a feature activation procedure. For example, at step 402, the method may include receiving from a SMF an N4 PFD management request, which may provision PDFs per application ID.

At step 403, the method may include receiving from the SMF requests to detect certain service data flows and/or application IDs, one request per UE's PDU session. For example, the SMF may instruct the UPF to monitor and report each UE's PDU session starting or stopping to use one or more particular applications. The SMF may instruct the UPF by configuring a PFCP session for the UE's PDU session with PDRs identifying the related Application IDs. The SMF may provision PFD rules at the UPF for all UEs to let the UPF know the traffic filters to apply for a specific application identified by an application ID. If so, the UPF may look up for the PFDs corresponding to the application IDs received in the SMF instruction (PDRs) to determine the traffic to detect and report.

At step 404, the method may include monitoring traffic belonging to specific service data flows and/or particular applications per UEs' PDU session, for each UE's PDU session for which such a request has been received from the SMF.

At step 405, the method may include transmitting to the SMF a notification per UE's PDU session of start/stop of application ID. For example, the UPF may generate a notification as per instructions of the SMF whenever the UPF detects that a PDU session starts or stops using the respective service data flows and/or applications.

An alternative embodiment may be performed at 406. For example, at 407, the method may include receiving from the SMF a request to detect certain service data flows and/or application IDs for a set of UE PDU sessions matching the criteria (i.e., a single request for a set of UEs' PDU sessions). At step 408, the method may include performing monitor network traffic for a set of UEs' PDU sessions, as instructed by the SMF. At step 409, the method may include transmitting to the SMF a notification for a list of UEs matching the grouping criteria (e.g., of start/stop of service data flows and/or application IDs). The notification may indicate the list of UE's PDU sessions matching the grouping criteria.

In various example embodiments, the UPF may detect UE's PDU sessions starting or stopping to use one or more specific applications identified by their Application IDs (and described by corresponding PFDs). For example, the PFD may have 3 tuple which includes server-IP address (EAS IP@). When the SMF groups the multiple UEs based on PFDs, this grouping may ensure that an ad-hoc group is always served by same EAS. A PFD may include information such as PFD ID, and one or more of a 3-tuple including protocol, server-side IP address (EAS IP@)) and port number; the significant parts of the URL to be matched (e.g., host name); and a domain name matching criteria and information about applicable protocols.

An alternative embodiment may be performed at step 410. At step 411, the method may include receiving from the SMF an N4 PFD management request (e.g., provisioning of the super-set PFD identified by a super-set application ID). At step 412, the method may include receiving from the SMF a request to detect service data flows of the super-set application ID for a set of UE PDU sessions. At step 413, the method may include monitoring traffic for each UE's PDU session for the super set PFDs. At step 413, the method may include transmitting to the SMF a notification for a list of UEs matching the super-set PFD.

FIG. 5 illustrates an example of a flow diagram of a method that may be performed by a SMF, such as NE 710 illustrated in FIG. 7, according to various example embodiments.

At step 501, the method may include receiving from a NEF a request for EAS deployment information from the SMF. As an example, the SMF may retrieve EAS deployment information (per application identifier) from the NEF (key: DNN/S-NSSAI). This EAS deployment information may be provided by an AF to the NEF which may store it in an UDR in a format, such as <EAS Deployment information>, <DNN or S-NSSAI>, <Application Identifier and/or internal group-Identifier>. The SMF may retrieve the EAS deployment information from the NEF, and configure the DNS handling rules to an EASDF, correspondingly. The SMF may configure the EASDF to retrieve information about DNS responses related with some applications. From the DNS responses, the SMF may be able to determine which UEs may be configured to use specific EAS IP address (for a specific application). Based on the received DNS response, the SMF may decide to insert or relocate a PSA-UPF (not shown) used by a PDU session.

At 502, a feature activation procedure may be performed. For example, at 503, the method may include determining that grouping criteria is locally configured.

At 504, the method may include transmitting to the EASDF a request, per UE's PDU session, to report DNS queries and DNS responses matching one or more specific fully qualified domain names (FQDNs) and/or EAS IP addresses. In an example embodiment, the SMF may interact with the EASDF to form a dynamic ad hoc group of a collection of UEs that could be subject to collective and common treatment. For example, based on the DNS response messages provided by the EASDF to the SMF, in order to learn the list of UEs associated with same edge application server and/or if the SMF decides based on DNS response message to use specific PSA-UPF and/or DNAI for multiple UEs.

At 505, the method may include receiving from the EASDF a notification per UE's PDU session when such DNS responses are received.

At 506, the method may include grouping UEs based upon the configured criteria and the notifications received from the EASDF, and/or assign ad-hoc groupID. For example, the SMF may instruct the EASDF to report DNS queries and DNS responses matching one or more specific FQDNs and/or a request to report DNS response matching specific EAS IP addresses. The EASDF may notify the SMF per UE's PDU session when such DNS response is received. Once the SMF receives the notification from the EASDF for each PDU session, the SMF may group them based on the grouping criteria.

In various example embodiments, the SMF may group UEs based on the current location (e.g., tracking area) of the UEs it is serving.

At 507, an alternative approach may be performed. Specifically, at 508, the method may include transmitting to the EASDF a request to report DNS queries and DNS responses matching one or more specific FQDNs and/or a request to report DNS response matching specific EAS IP addresses for any PDU session for any UE matching criteria (i.e., a single request is sent for a set of PDU sessions). At 509, the method may include receiving from the EASDF a notification for any PDU session of any UE possibly matching certain criteria, optionally with the identity of such UE's PDU sessions, when such DNS response is received. At 510, the method may include assigning an adhoc-group ID to that UE.

In some example embodiments, the SMF may instruct the EASDF to report DNS queries and DNS responses matching one or more specific FQDNs and/or a request to report DNS response matching specific EAS IP addresses for any PDU session of any UE possibly matching certain criteria (e.g., a specific S-NSSAI and DNN). Once the SMF receives notification from the EASDF, the SMF may assign an adhoc-group ID for the same.

At 511, the method may include storing at a UDR the adhoc-groupID with a list of UEs.

At 512, the method may include determining that AF notification criteria is met.

At 513, the method may include transmitting to the NEF Nsmf_EventExposure_Notify (<ad-hoc groupID>, group-Type, Member List). In particular, when the AF notification Criteria (e.g., UE mobility/new PSA-UPF, DNAI change) is met, the SMF may send <ad-hoc groupID>+(optionally) <list of UEs>+<details> to the NEF/AF. Subsequently, the AF may take offloading decision for the group of UEs.

At 514, the method may include transmitting to the AF Nsmf_EventExposure_Notify (<ad-hoc groupID, group-Type, Member List).

Figure 6:
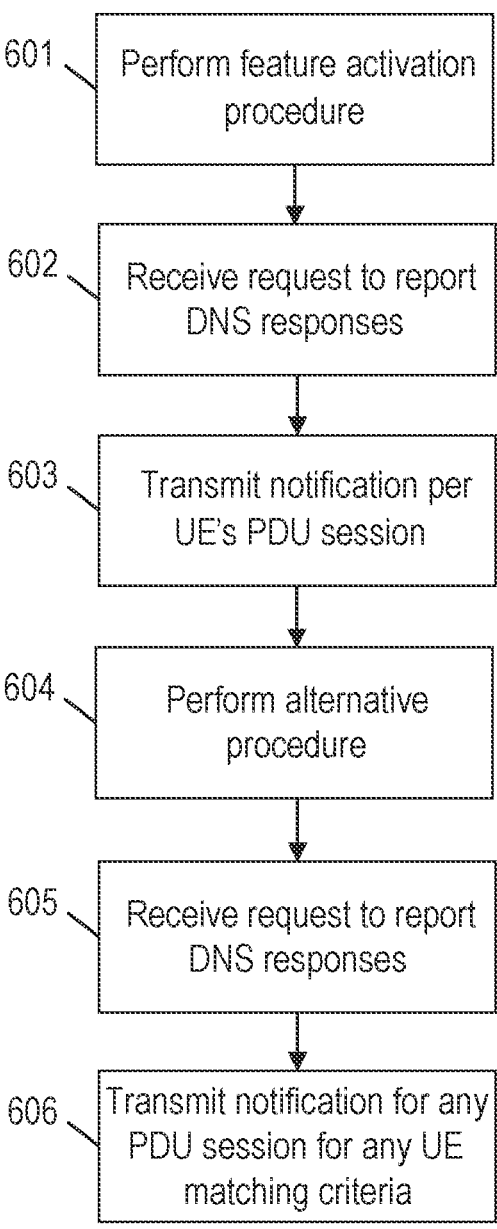
FIG. 6 illustrates an example of a flow diagram of another EASDF-based method performed by an EASDF according to various example embodiments.

FIG. 6 illustrates an example of a flow diagram of a method that may be performed by an EASDF, such as NE 710 illustrated in FIG. 7, according to various example embodiments.

At step 601, a feature activation procedure may be performed.

At 602, the method may include receiving from an SMF a request, per UE's PDU session, to report DNS queries and DNS responses matching one or more specific fully qualified domain names (FQDNs) and/or EAS IP addresses. In an example embodiment, the SMF may interact with the EASDF to form a dynamic ad hoc group of a collection of UEs that could be subject to collective and common treatment. For example, based on the DNS response messages provided by the EASDF to the SMF, in order to learn the list of UEs associated with same edge application server and/or if the SMF decides based on DNS response message to use specific PSA-UPF and/or DNAI for multiple UEs.

At step 603, the method may include transmitting to the SMF a notification per UE's PDU session when such DNS responses are received.

At step 604, an alternative approach may be performed. Specifically, at step 605, the method may include receiving from the SMF a request to report DNS queries and DNS responses matching one or more specific FQDNs and/or a request to report DNS response matching specific EAS IP addresses for any PDU session for any UE matching criteria (i.e., a single request is sent for a set of PDU sessions). At step 606, the method may include transmitting to the SMF a notification for any PDU session of any UE possibly matching certain criteria, optionally with the identity of such UE's PDU sessions, when such DNS response is received.

In some example embodiments, the SMF may instruct the EASDF to report DNS queries and DNS responses matching one or more specific FQDNs and/or a request to report DNS response matching specific EAS IP addresses for any PDU session of any UE possibly matching certain criteria (e.g., a specific S-NSSAI and DNN). Once the SMF receives notification from the EASDF, the SMF may assign an adhoc-group ID for the same.

FIG. 7 illustrates an example of a system according to certain example embodiments. In one example embodiment, a system may include multiple devices, such as, for example, NE 710 and/or UE 720.

NE 710 may be one or more of a base station (e.g., 3G UMTS NodeB, 4G LTE Evolved NodeB, or 5G NR Next Generation NodeB), a serving gateway, a server, and/or any other access node or combination thereof.

NE 710 may further comprise at least one gNB-centralized unit (CU), which may be associated with at least one gNB-distributed unit (DU). The at least one gNB-CU and the at least one gNB-DU may be in communication via at least one F1 interface, at least one Xn-C interface, and/or at least one NG interface via a 5GC.

UE 720 may include one or more of a mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, or any combination thereof. Furthermore, NE 710 and/or UE 720 may be one or more of a citizens broadband radio service device (CBSD).

NE 710 and/or UE 720 may include at least one processor, respectively indicated as 711 and 721. Processors 711 and 721 may be embodied by any computational or data processing device, such as a central processing unit (CPU), application specific integrated circuit (ASIC), or comparable device. The processors may be implemented as a single controller, or a plurality of controllers or processors.

At least one memory may be provided in one or more of the devices, as indicated at 712 and 722. The memory may be fixed or removable. The memory may include computer program instructions or computer code contained therein. Memories 712 and 722 may independently be any suitable storage device, such as a non-transitory computer-readable medium. The term "non-transitory," as used herein, may correspond to a limitation of the medium itself (i.e., tangible, not a signal) as opposed to a limitation on data storage persistency (e.g., random access memory (RAM) vs. read-only memory (ROM)). A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory, and which may be processed by the processors, may be any suitable form of computer program code, for example, a compiled or interpreted computer program written in any suitable programming language.

Processors 711 and 721, memories 712 and 722, and any subset thereof, may be configured to provide means corresponding to the various blocks of FIGS. 1-2. Although not shown, the devices may also include positioning hardware, such as GPS or micro electrical mechanical system (MEMS) hardware, which may be used to determine a location of the device. Other sensors are also permitted, and may be configured to determine location, elevation, velocity, orientation, and so forth, such as barometers, compasses, and the like.

As shown in FIG. 7, transceivers 713 and 723 may be provided, and one or more devices may also include at least one antenna, respectively illustrated as 714 and 724. The device may have many antennas, such as an array of antennas configured for multiple input multiple output (MIMO) communications, or multiple antennas for multiple RATs. Other configurations of these devices, for example, may be provided. Transceivers 713 and 723 may be a transmitter, a receiver, both a transmitter and a receiver, or a unit or device that may be configured both for transmission and reception.

The memory and the computer program instructions may be configured, with the processor for the particular device, to cause a hardware apparatus, such as UE, to perform any of the processes described above (i.e., FIGS. 1-2). Therefore, in certain example embodiments, a non-transitory computer-readable medium may be encoded with computer instructions that, when executed in hardware, perform a process such as one of the processes described herein. Alternatively, certain example embodiments may be performed entirely in hardware.

In certain example embodiments, an apparatus may include circuitry configured to perform any of the processes or functions illustrated in FIGS. 1-2. As used in this application, the term "circuitry" may refer to one or more or all of the following: (a) hardware-only circuit implementations (such as implementations in only analog and/or digital circuitry), (b) combinations of hardware circuits and software, such as (as applicable): (i) a combination of analog and/or digital hardware circuit(s) with software/firmware and (ii) any portions of hardware processor(s) with software (including digital signal processor(s)), software, and memory (ies) that work together to cause an apparatus, such as a mobile phone or server, to perform various functions), and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Figure 8:
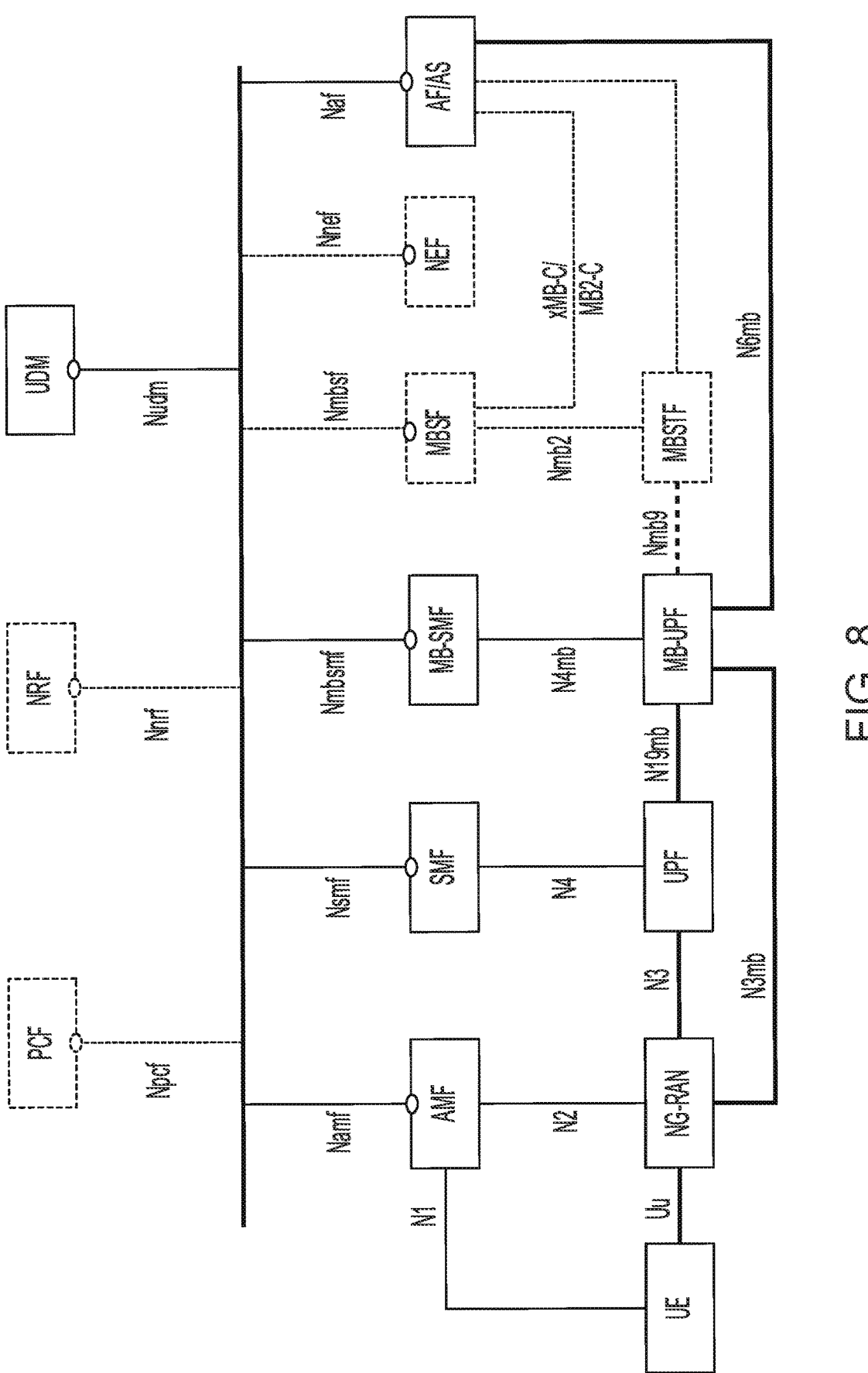
FIG. 8 illustrates an example of a 5G network and system architecture according to some example embodiments.

FIG. 8 illustrates an example of a 5G network and system architecture according to certain example embodiments. Shown are multiple network functions that may be implemented as software operating as part of a network device or dedicated hardware, as a network device itself or dedicated hardware, or as a virtual function operating as a network device or dedicated hardware. The NE and UE illustrated in FIG. 8 may be similar to NE 710 and UE 720, respectively. The UPF may provide services such as intra-RAT and inter-RAT mobility, routing and forwarding of data packets, inspection of packets, user plane quality of service (QOS) processing, buffering of downlink packets, and/or triggering of downlink data notifications. The AF may primarily interface with the core network to facilitate application usage of traffic routing and interact with the policy framework.

According to certain example embodiments, processors 711 and 721, and memories 712 and 722, may be included in or may form a part of processing circuitry or control circuitry. In addition, in some example embodiments, transceivers 713 and 723 may be included in or may form a part of transceiving circuitry.

In some example embodiments, an apparatus (e.g., NE 710 and/or UE 720) may include means for performing a method, a process, or any of the variants discussed herein. Examples of the means may include one or more processors, memory, controllers, transmitters, receivers, and/or computer program code for causing the performance of the operations.

In various example embodiments, apparatus 710 may be controlled by memory 712 and processor 711 to form at least one ad-hoc group of user equipment based upon detecting user equipment matching at least one grouping criteria; and report the forming of the at least one ad-hoc group to a network exposure function or an application function based upon at least one notification condition.

Certain example embodiments may be directed to an apparatus that includes means for performing any of the methods described herein including, for example, means for forming at least one ad-hoc group of user equipment based upon detecting user equipment matching at least one grouping criteria; and means for reporting the forming of the at least one ad-hoc group to a network exposure function or an application function based upon at least one notification condition.

In various example embodiments, apparatus 710 may be controlled by memory 712 and processor 711 to receive, from a session management function, at least one domain name system response matching at least one of: at least one specific fully qualified domain name or at least one edge application server internet protocol address for at least one protocol data unit session of at least one user equipment that matches the configured criteria; and transmit, to the session management function, a notification for the at least one protocol data unit session of at least one user equipment that matches the configured criteria.

Certain example embodiments may be directed to an apparatus that includes means for performing any of the methods described herein including, for example, means for receiving, from a session management function, at least one domain name system response matching at least one of: at least one specific fully qualified domain name or at least one edge application server internet protocol address for at least one protocol data unit session of at least one user equipment that matches the configured criteria; and means for transmitting, to the session management function, a notification for the at least one protocol data unit session of at least one user equipment that matches the configured criteria.

The features, structures, or characteristics of example embodiments described throughout this specification may be combined in any suitable manner in one or more example embodiments. For example, the usage of the phrases "various embodiments," "certain embodiments," "some embodiments," or other similar language throughout this specification refers to the fact that a particular feature, structure, or characteristic described in connection with an example embodiment may be included in at least one example embodiment. Thus, appearances of the phrases "in various embodiments," "in certain embodiments," "in some embodiments," or other similar language throughout this specification does not necessarily all refer to the same group of example embodiments, and the described features, structures, or characteristics may be combined in any suitable manner in one or more example embodiments.

As used herein, "at least one of the following: <a list of two or more elements>" and "at least one of <a list of two or more elements>" and similar wording, where the list of two or more elements are joined by "and" or "or," mean at least any one of the elements, or at least any two or more of the elements, or at least all the elements.

Additionally, if desired, the different functions or procedures discussed above may be performed in a different order and/or concurrently with each other. Furthermore, if desired, one or more of the described functions or procedures may be optional or may be combined. As such, the description above should be considered as illustrative of the principles and teachings of certain example embodiments, and not in limitation thereof.

One having ordinary skill in the art will readily understand that the example embodiments discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of the example embodiments.

PARTIAL GLOSSARY

3GPP 3$^{rd}$ Generation Partnership Project
5G 5$^{th}$ Generation
5GC 5$^{th}$ Generation Core
5GS 5$^{th}$ Generation System
6G 6$^{th}$ Generation
AF Application Function
AMF Access and Mobility Management Function
ASIC Application Specific Integrated Circuit
ASP Application Service Provider
CBSD Citizens Broadband Radio Service Device
C-DNS Central Domain Name System
C-NEF Central Network Exposure Function
C-PSA UPF Central Protocol Data Unit Session Anchor User Plane Function
CPU Central Processing Unit
CU Centralized Unit
DN Data Network
DNAI Data Network Access Identifier
DNN Data Name Network
DNS Domain Name System
DU Distributed Unit
EAS Edge Application Server
EASDF Edge Application Server Discovery Function
ECS Edge Configuration Server
EDC Edge Domain Name System Client
EES Edge Enabler Server
EHE Edge Hosting Environment
eMBB Enhanced Mobile Broadband
Evolved Node B eNB
FQDN Fully Qualified Domain Name
gNB Next Generation Node B
GPS Global Positioning System
GPSI Generic Public Subscription Identifier
HDD Hard Disk Drive
IoT Internet of Things
IP Internet Protocol
L-DN Local Part of Domain Name
L-DNS Local Domain Name System
L-NEF Local Network Exposure Function
L-PSA UPF Local Protocol Data Unit Session Anchor User Plane Function
LTE Long-Term Evolution LTE-A Long-Term Evolution Advanced
MAC Medium Access Control
MEMS Micro Electrical Mechanical System
MIMO Multiple Input Multiple Output
mMTC Massive Machine Type Communication
NE Network Entity
NEF Network Exposure Function
NG Next Generation
NG-eNB Next Generation Evolved Node B
NG-RAN Next Generation Radio Access Network
NR New Radio
PCC Policy and Charging Control
PCF Policy Control Function
PDA Personal Digital Assistance
PDU Protocol Data Unit
PFD Packet Flow Description
PFDF Packet Flow Description Function
PHY
PLMN
PSA
Physical
Public Land Mobile Network
Protocol Data Unit Session Anchor
QOS Quality of Service
RAM Random Access Memory
RAN Radio Access Network
RAT Radio Access Technology
PDR Packet Detection Rules
RF Radio Frequency
ROM Read-Only Memory
SMF Session Management Function
S-NSSAI Single Network Slice Selection Assistance
    Information
TA Tracking Area
UDM Unified Data Manager
UDR Unified Data Repository
UE User Equipment
UMTS Universal Mobile Telecommunications System
UPF User Plane Function
URL Uniform Resource Location
URLLC Ultra-Reliable and Low-Latency Communica-
    tion
UTRAN Universal Mobile Telecommunications System
    Terrestrial Radio Access Network
V2X Vehicle-to-Everything
WLAN Wireless Local Area Network
We claim:

1. A method comprising:
    forming, by a session management function, at least one
        ad-hoc group of user equipment based upon detecting
        user equipment matching at least one grouping criteria,
        wherein the forming further comprises:
    detecting, by the session management function, at least
        one protocol data unit session of the user equipment
        starting or stopping to use one or more specific appli-
        cations; and
    reporting, by the session management function, the form-
        ing of the at least one ad-hoc group to a network
        exposure function or an application function based
        upon at least one notification condition.
2. The method of claim 1, wherein the forming comprises
one of creating, modifying, or deleting the ad-hoc group.
3. The method of claim 1, wherein the ad-hoc group is
associated with an ad-hoc group identifier, and at least one
of a plurality of user equipment or user equipment protocol
data unit sessions matching at least one of the same set of
grouping criteria.

4. The method of claim 1, wherein the at least one
grouping criteria comprises at least one of the following:
    each user equipment or user equipment protocol data unit
        session using the same protocol data unit session
        anchor-user plane function;
    each user equipment or user equipment protocol data unit
        session using the same application;
    each user equipment or user equipment protocol data unit
        session using at least one of the same network slice
        selection assistance information and the same data
        name network; or
    each user equipment is located in a same area.
5. The method of claim 4, wherein the at least one
grouping criteria further comprises at least one of the
following:
    each user equipment or user equipment protocol data unit
        session using a specific protocol data unit session
        anchor-user plane function;
    each user equipment or user equipment protocol data unit
        session using a specific application;
    each user equipment or user equipment protocol data unit
        session using at least one of a specific network slice
        selection assistance information and a specific data
        name network; or
    each user equipment is located in a specific area.
6. The method of claim 1, further comprising:
    transmitting, by the session management function,
        instructions to a user plane function to monitor and
        report each protocol data unit session starting or stop-
        ping to user one or more specific applications.
7. The method of claim 6, wherein the transmitting further
comprises:
    configuring, by the session management function, a
        packet forwarding control protocol session for the
        protocol data unit sessions comprising:
    at least one packet detection rule comprising at least one
        of an application identifier and a packet flow descrip-
        tion; and
    at least one reporting rule instructing the user plane
        function to report when the protocol data unit session
        starts or stops using the at least one application iden-
        tified by the at least one application identifier or packet
        flow description.
8. The method of claim 7, wherein the transmitting further
comprises:
    receiving, by the session management function, a notifi-
        cation from a user plane function notifying that one or
        more protocol data unit sessions starts or stops using
        the at least one application identified by the at least one
        application identifier or packet flow description; and
    grouping, by the session management function, the at
        least one user equipment or user equipment packet data
        unit sessions using the one or more same applications.
9. The method of claim 6, wherein the transmitting further
comprises:
    instructing, by the session management function, a user
        plane function to monitor at least one protocol data unit
        session of at least one user equipment matching at least
        one of a single network slice selection assistance infor-
        mation and a data name network; and
    starting or stopping to use one or more applications
        identified according to application identifier or packet
        flow description.
10. The method of claim 1, further comprising:
    transmitting, by the session management function,
        instructions to an edge application server discovery
        function to monitor and report when a user equipment sends a domain name server query request targeting at least one specific fully qualified domain name or when edge application server discovery function detects in the domain name server response at least one edge application server internet protocol address that matches the grouping criteria, for at least one protocol data unit session of at least one user equipment that matches the grouping criteria.

11. The method of claim 10, wherein the transmitting further comprises:

receiving, by the session management function, a notification from an edge application server discovery function notifying that at least one user equipment sends a domain name server query request targeting at least one specific fully qualified domain name or notifying from an edge application server discovery function when it detects in the domain name server response at least one edge application server internet protocol address; and grouping, by the session management function, the at least one user equipment or user equipment packet data unit sessions using the one or more same applications.

12. The method of claim 1, wherein the at least one grouping criteria is received by the session management function from other entities or is locally configured.

13. The method of claim 12, further comprising:

assigning, by the session management function, at least one ad-hoc group identifier associated with the set of user equipment matching the at least one grouping criteria.

14. The method of claim 13, further comprising:

storing, in a data repository, the at least one ad-hoc group identifier with the at least one grouping criteria and the at least one of the set of user equipment or user equipment packet data unit sessions matching the grouping criteria.

15. The method of claim 1, further comprising:

coordinating, at the data repository, the at least one ad-hoc group identifier associated with the ad-hoc group to ensure that a single group identifier is associated with the ad-hoc group in multiple session management functions of the network.

16. The method of claim 1, wherein the at least one notification condition corresponds to at least one of the following:

reporting a notification when a group is created matching at least one of the grouping criteria;

reporting a notification when a group matching at least one of the grouping criteria is modified; or reporting a notification when a group matching all the grouping criteria is deleted.

17. The method of claim 1, further comprising:

transmitting, to a network exposure function or an application function, an event informing of the assignment of a set of users matching grouping criteria to a group.

18. The method of claim 17, wherein the event comprises at least one of the following: at least one ad-hoc group identifier, at least one group type, or at least one member list.

19. A method comprising:

forming, by a session management function, at least one ad-hoc group of user equipment based upon detecting user equipment matching at least one grouping criteria;

reporting, by the session management function, the forming of the at least one ad-hoc group to a network exposure function or an application function based upon at least one notification condition; and coordinating, at a data repository, at least one ad-hoc group identifier associated with the at least one ad-hoc group to ensure that a single group identifier is associated with the at least one ad-hoc group in multiple session management functions of a network.

* * * * *